(12) United States Patent
Sinyashin et al.

(10) Patent No.: US 10,781,224 B2
(45) Date of Patent: Sep. 22, 2020

(54) BIS(OXYMETHYL)PHOSPHINIC ACID AND BIOGENIC METAL SALTS THEREOF AS REGULATORS OF PLANT GROWTH AND DEVELOPMENT

(71) Applicant: Kirill Olegovich Sinyashin, Kazan (RU)

(72) Inventors: Kirill Olegovich Sinyashin, Kazan (RU); Alla Yakovlevna Barchukova, Krasnodar (RU); Marina Mikhailovna Shulaeva, Kazan (RU)

( * ) Notice: Subject to any disclaimer, the term of this patent is extended or adjusted under 35 U.S.C. 154(b) by 0 days.

(21) Appl. No.: 16/337,023

(22) PCT Filed: Sep. 13, 2017

(86) PCT No.: PCT/RU2017/000667
§ 371 (c)(1),
(2) Date: Mar. 27, 2019

(87) PCT Pub. No.: WO2018/070902
PCT Pub. Date: Apr. 19, 2018

(65) Prior Publication Data
US 2020/0031854 A1  Jan. 30, 2020

(30) Foreign Application Priority Data

Oct. 11, 2016 (RU) ................. 2016140004

(51) Int. Cl.
*C07F 9/30* (2006.01)
*A01N 57/20* (2006.01)
*C05B 15/00* (2006.01)

(52) U.S. Cl.
CPC .............. *C07F 9/301* (2013.01); *A01N 57/20* (2013.01); *C05B 15/00* (2013.01)

(58) Field of Classification Search
CPC .......... C07F 9/301; C05B 57/20; A01N 57/20
USPC ........................................................ 562/23
See application file for complete search history.

(56) References Cited

FOREIGN PATENT DOCUMENTS

| CN | 101845058 | | 9/2010 | |
|---|---|---|---|---|
| CN | 101845058 A | * | 9/2010 | |
| DE | 4016258 A1 | * | 11/1991 | ................ C07F 9/02 |
| DE | 4016258 A1 | | 11/1991 | |
| RU | 2158735 C1 | * | 11/2000 | |
| RU | 2158735 C1 | | 11/2000 | |

OTHER PUBLICATIONS

Afonin et al., Russian Journal of Coordination Chemistry, vol. 32, No. 2, pp. 94-98. (Year: 2006).*
Alexandrov et al., Synthesis and Crystal Structure, Russian Journal of Inorganic Chemistry, 43, p. 71, abstract. (Year: 1998).*
Afonin E.G. et al. BIS[Di(hydroxymethyl) phosprunato]diaquacobalt (II), Co(H2O2)2 {(HoCH2)2Po2}2]: Synthesis, Properties, and Crystal Structure. Russian Journal of Coordination Chemistry, 2006, vol. 32, n. 2, pp. 94-98, p. 94.
Aleksandrov G.G. et al. Sintez i kristallicheskaya struktura digidrata bis[di(gidroksimetil)fosfinato]diakvamedi (II) Cu{HoCH2) 2Po2}(H2O)2. Zhurnal neogranicheskoi khimii, 1998, vol. 43, N 1, p. 71-75, p. 64-68, abstract, p. 71.

* cited by examiner

*Primary Examiner* — Deborah D Carr
(74) *Attorney, Agent, or Firm* — John Alumit

(57) ABSTRACT

The invention relates to agriculture, and specifically to regulators of plant growth and development that can be used for the pre-sowing treatment of cereal crop seeds and are in the form of bis(oxymethyl)phosphinic acid and biogenic metal salts thereof with the general formula (I) $Me^{n+}[OP(O)(CH_2OH)_2]_n$, where n may be 1 or 2 and Me may be any of the following: H, Na, Ca, Mg, Co, Cu, Zn, Mn. The claimed compounds of formula I are effective regulators of plant growth and development when acting in concentrations of $1 \cdot 10^{-7} - 1 \cdot 10^{-12}\%$. Pre-sowing treatment of the seeds of cereal crops, namely wheat, corn and rice, by means of the claimed compounds increases germination energy and germination capacity up to 13%, also increases plant vigor, and rootlet and shoot lengths increase up to 36%. Crop harvests increase and the quality of the resulting grain improves, which expands the range of effective, environmentally friendly plant growth and development regulators that act at the level of natural phytohormones.

4 Claims, No Drawings

BIS(OXYMETHYL)PHOSPHINIC ACID AND BIOGENIC METAL SALTS THEREOF AS REGULATORS OF PLANT GROWTH AND DEVELOPMENT

FIELD OF THE INVENTION

The invention relates to agriculture, specifically, to the use of biogenic metal salts of bis-(hydroxymethyl)-phosphinic acid (BHMPA) of general formula I:

$$Me^{n+}[OP(O)(CH_2OH)_2]_n \quad (I),$$

where n can be 1 or 2, and Me can be any of the following: H, Na, Ca, Mg, Co, Cu, Zn, Mn.

PRIOR ART

The use of organophosphorus acids, including phosphinic acids, and various derivatives thereof as regulators of plant growth Is known in the art [N. N. Melnikov, K. V. Novozhilov, S. R. Belan. Pesticides and Plant Growth Regulators. Manual, Pub. M.; Khimia. 1995, pp. 43, 56, 58, 200]. Such compounds, however, are often toxic; the concentrations (doses) used for treating seeds are relatively high, the methods for the preparation thereof are rather complex, the compounds themselves are insufficiently stable and insoluble in water. Thus, developing and applying effective and highly water-soluble synthetic plant growth and development regulators, which stay effective at ultralow concentrations, is quite relevant.

The claimed BHMPA and salts thereof with Na, Mg, Zn, Ca, Co, Cu are known in the art. Thus, sodium, magnesium, and calcium salts and methods of the preparation thereof by reacting phosphinates of the following formula $Me^{n+}[H_2PO^-]_n$ with paraformaldehyde in water in an autoclave (100-200° C., 5-20 hr.) are described in [DE19904016258, 1991].

A method for the preparation and application of calcium and magnesium BHMPA salts as additives to fire-proof compositions for cellulose fiber and melamine-based polymeric products [IL19800060453, 1983, KR2012100043, 2014] is known in the art.

A method for the preparation of sodium, cobalt, and copper BHMPA salts is described in Inorganic Chemistry Communications, 2010, 13, 1530-1533 for sodium salt, Coordination Chemistry, 2006, volume 32, #2, 101-105 for cobalt salt, and Inorganic Chemistry Journal, 1998, volume 43, #1, 71-75 for copper salt. The BHMPA magnesium salt has not been mentioned in the literature.

BHMPA is known in the art [V. Yu. Nazarov, A. A. Muslinkin, A. A. Kutuev, Study of Optimum Conditions for BHMPA Synthesis. Applied Chemistry Journal, 1981, volume 54, #9, pp 2115-2119], but growth-regulating properties of said acid and salts thereof with biogenic metals aren't known.

Melaphen (melamine salt of BHMPA of formula II [RU2158735, 2001] has the closest structure, properties, and concentrations (doses), in which it is used, to those of the claimed compounds.

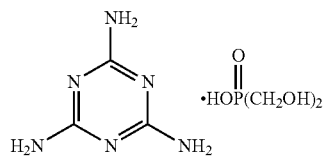

II

Melaphen is a synthetic plant growth and development regulator that exhibits a wide range of biological activity. Melaphen is used in pre-sowing seed treatment and it is effective at very low concentrations ($1 \cdot 10^{-7}$-$1 \cdot 10^{-12}$%) compatible to natural phytohormones. Today, it is the only synthetic plant growth regulator effective at ultralow concentrations [RU2354106, 2009; RU2390984, 2010; RU2354105, 2009]. The mechanism of its action, its application in agriculture, biotechnology, and environmental biotechnology have been thoroughly studied [Melaphen; Mechanism of Action and Use. Kazan, Pechat-Service-XXI century, 2014, 408 p.]

Abundant and stable harvests are known to be products of seed material quality, the fact that is substantiated by the seed-germination process. There are two main approaches to the regulation of seed-germination: applying chemicals or applying physical factors. Seed treatment with growth regulators stimulates their germination and produces uniform morphological and physiological plant modifications [Sytie P. Effect of very small amounts of highly active biological substances on plant growth. Biol. Agr. Hortic. 1985. V. 2, No3, $_p$. 245-269; RU2354106, 2001].

SUMMARY OF THE INVENTION

The objective of the present invention is to expand the arsenal of eco-friendly effective synthetic plant growth regulators having an impact and valid concentrations (doses) compatible to those of natural phytohormones.

The technical result is the preparations that in ultralow doses ($1 \cdot 10^{-7}$%-$1 \cdot 10^{-12}$%) can regulate plant growth and development during pre-sowing seed treatment Said technical result is achieved with the claimed BHMPA and salts thereof with biogenic metals (Na, Ca, Mg, Co, Cu, Zn, Mn).

EMBODIMENTS

To better understand the invention, the following exemplary embodiments of a specific preparation method of the claimed compounds and testing results of said compounds as plant growth and development regulators are provided below.

Example 1

BHMPA is prepared according to the method described in [V. Yu. Nazarov, A. A. Muslinkin, A. A. Kutuev, Study of Optimum Conditions for Synthesis of Bis-(Hydroxymethyl)-Phosphinic Acid. Applied Chemistry Journal, 1981, volume 54, #9, pp 2115-2119].

$HOP(O)(CH_2OH)_2$

Found, %: C, 18.95; H, 5.52; P, 24.62. Calculated, %: C, 19.06; H, 5.60; P, 24.57. NMR 31P, δ, ppm., $H_2O$: 46.72.

Salts of biogenic metals and BHMPA were prepared according to the procedure described in Examples 2-8.

Example 2

Sodium BHMPA Salt (Na-Salt).

A solution of 25.2 g BHMPA in 50 ml of methanol is added dropwise to sodium methylate prepared from 4.6 g Na in 100 ml of methanol; the reaction mixture is heated at 40-50° C. for 30 min., cooled to 20° C.; the formed precipitate is filtered and dried under low pressure at 50° C. to yield 10 g (78%) of white crystalline substance.

NaOP(O)(CH$_2$OH)$_2$

Found, %: C, 16.15; H, 4.16; P, 21.06. Calculated, %: C, 16.23; H, 4.09; P, 20.92. NMR $^{31}$P, δ, ppm, H$_2$O: 36.68.

Example 3

Calcium BHMPA Salt (Ca-Salt).

A solution of 68.9 g (10% excess) BHMPA in 100 ml of water is added dropwise to a suspension of 25 g finely ground calcium carbonate ("cp" grade) in 200 ml of water; the reaction mixture is heated at 60-70° C. for 2 hrs., cooled to 20° C.; filtered to remove the cloudy precipitate and evaporated under low pressure at 50-55° C. The residue is treated with 200 ml of methanol, filtered, and dried under low pressure at 50° C. to yield 72.5 g (99%) of white crystalline substance.

Ca [OP(O)(CH$_2$OH)$_2$]$_2$

Found, %: C, 16.55; H, 3.26; P, 21.60. Calculated, %: C, 16.56; H, 4.17; P, 21.35. NMR$^{31}$ δ, 5, ppm, H$_2$O: 36.64.

Example 4

Magnesium BHMPA Salt (Mg-Salt).

A solution of 59.3 g (0.275 mole) BHMPA in 100 ml of water is added dropwise to a suspension of 20.4 g finely ground aqueous basic magnesium carbonate ("p" grade, Mg content 24.5%-27%) in 200 ml of water; the reaction mixture is heated at 60-70° C. for 2 hrs., cooled to 20° C.; filtered to remove the cloudy precipitate and evaporated under low pressure at 50° C. The residue is treated with 200 ml of methanol, filtered, and dried under low pressure at 50° C. to yield 51.3 g (92%) of white crystalline substance.

Mg[OP(O)(CH$_2$OH)$_2$]$_2$

Found %: C, 17.55; H, 4.26; P, 22.60. Calculated %: C, 17.51; H, 4.41; P, 22.58.

Example 5

Cobalt BHMPA Salt (Co-Salt).

A solution of 6.8 g (15% excess) BHMPA in 20 ml of water is added dropwise to a suspension of 2.6 g finely ground aqueous basic cobalt carbonate ("p" grade, Co content 45%-53%) in 40 ml of water; the reaction mixture is heated at 50-60° C. for one hr., cooled to 20° C.; filtered to remove the cloudy precipitate and evaporated under low pressure at 50-55° C. The residue is treated with 50 ml of methanol, filtered, and dried under low pressure at 50° C. to yield 5.2 g (84%) of white crystalline substance.

Co[OP(O)(CH$_2$OH)$_2$]$_2$ 2H$_2$O

Found %: C, 14.01; H, 4.56; P17.64. Calculated %: C, 13.92; H, 4.67; P17.95.

Example 6

Copper BHMPA Salt (Cu-Salt).

A solution of 8.7 g (15% excess) BHMPA in 20 ml of water is added dropwise to a suspension of 3.62 g finely ground aqueous basic copper carbonate ("p" grade, 96% content of basic copper carbonate) in 40 ml of water; the reaction mixture is heated at 50-60° C. for one hr., cooled to 20° C.; filtered to remove the cloudy precipitate and evaporated under low pressure at 50-55° C. The residue is treated with 50 ml of methanol, filtered, and dried under low pressure at 50° C. to yield 8.7 g (96%) of white crystalline substance.

Cu[OP(O)(CH$_2$OH)$_2$]$_2$ 0.5H$_2$O

Found %: C, 14.43; H, 3.96; P, 19.40. Calculated %: C, 14.89; H, 4.06; P, 19.20.

Example 7

Zinc BHMPA Salt (Zn-Salt).

A solution of 9.2 g (15% excess) BHMPA in 20 ml of water is added dropwise to a suspension of 3.76 g finely ground zinc carbonate ("p" grade) in 40 ml of water; the reaction mixture is heated at 50-60° C. for one hr., cooled to 20° C.; filtered to remove the cloudy precipitate and evaporated under low pressure at 50-55° C. The residue is treated with 50 ml of methanol, filtered, and dried under low pressure at 50° C. to yield 9.15 g (97%) of white crystalline substance.

Zn[OP(O)(CH$_2$OH)$_2$]$_2$

Found %: C, 15.14; H, 3.76; P, 19.30. Calculate %: C, 15.23; H, 3.84; P, 19.64. NMR$^{31}$P, δ, ppm, H$_2$O: 36.7.

Example 8

Manganese BHMPA Salt (Mn-Salt).

A solution of 9.1 g (15% excess) BHMPA in 20 ml of water is added dropwise to a suspension of 3.45 g of finely ground basic manganese (II) carbonate ("p" grade, Mn content 42%-45%) in 40 ml of water; the reaction mixture is heated at 50-60° C. for one hr., cooled to 20° C.; filtered to remove the cloudy precipitate and evaporated under low pressure at 50-55° C. The residue is treated with 50 ml of methanol, filtered, and dried under low pressure at 50° C. to yield 8.0 g (87%) of white crystalline substance.

Mn[OP(O)(CH$_2$OH)$_2$]$_2$ 2H$_2$O

Found %: C, 14.04; H, 4.56; P, 17.93. Calculated %: C, 14.09; H, 4.73; P, 18.16.

According to Examples 1-8, BHMPA and its salts are readily soluble in water and stable when stored.

Study Results of the Effect of the Claimed Compounds on Germination Energy, Germination Rate, and Growth and Development of Plants The objects of the study are cereal crops: winter and spring wheat, corn, and rice.

Experimental Procedure:

Control—Soaking Seeds in Water;

Experimental versions—soaking seeds in BHMPA solutions and solutions of BHMPA Ca, Mg, Na, Co, Mn, Cu, and Zn salts at 1·10$^{-6}$-1·10$^{-12}$% concentrations (doses). The studies were conducted in laboratory in Petri dishes; seed bed—two layers of filter paper. 50 seeds soaked in water (control) and in the solutions of the tested compounds (experimental) were placed into each dish. Wheat, corn, and rice seeds were exposed for one hour.

Analysis was conducted according to the government standards GOST 12038-84 "Crop seeds. Technical conditions for determining the germination energy and germination rate", GOST 12044-93 "Crop seeds. Methods for determining disease contamination."

Seed germination energy and rate were calculated in percent as an arithmetic mean of the four experimental results (germination energy on the 4$^{th}$ day, wheat germination on the 8$^{th}$ day, rice and corn germination—on the 7$^{th}$ day). Germination was determined based on the germinating power indicators (length of the roots and sprouts and their wet and dry mass per 100 shoots).

The study of the effect of pre-sowing seed treatment with BHMPA was conducted on winter wheat (Kazan-500 variety) and spring wheat (Ekada-66 variety).

Comparative study results of spring wheat seed treatment with BHMPA vs. Melaphen solutions are shown in Table I. Table I demonstrates that treating spring wheat seeds with a BHMPA solution at $1·10^{-9}$% and $1·10^{-12}$% concentrations had a favorable effect on the height and germination of the plants, compatible to that of Melaphen. The effect of the treatment with BHMPA on phytopathological properties of spring wheat seeds was examined and the results are presented in Table II. Table II shows that the overall seed contamination in the control was 59%. The lowest seed contamination of 21.5% was observed in the sample treated with $1·10^{-9}$% BHMPA, which is lower than that of the control by 38%. The biological activity in this case was 64.4%. In other samples, contamination of the seeds also remained lower than that of the control. Treatment of seeds with BHMPA solutions reduced their overall contamination.

Results of winter wheat seed treatment with BHMPA solutions are presented in Table III. Table III shows that BHMPA at a $1·10^{-9}$% concentration elicited the most significant impact, increasing the germination energy, germination rate, plant heights, and the number and length of the roots. In other samples, the data didn't show any advantage over the control. Treatment of seeds with the acid solution at $1·10^{-1}$% and $1·10^{-12}$% concentrations improves the plant height, germination energy, and the number of roots.

Results presented in Tables I-III indicate that BHMPA exhibits the growth-regulating ability at $1·10^{-9}$%, $1·10^{-11}$% and $1·10^{-12}$% concentrations but has a lesser impact than that of the prototype Melaphen.

Melaphen is a salt of BHMPA and a heterocyclic base, melamine. Technical-grade melamine is known to be used as a nutrient for cucumbers [Allan J. J., Kaszkiewicz B. Przem. Chem., 1986, 65. RCJ 70501, 1987]. The putative behavior of the claimed growth and development regulators, BHMPA salts with biogenic metals, was not in the least obvious.

The effect of pre-sowing seed treatment with the claimed BHMPA salts of biogenic metals was studied on winter wheat (Vershin variety), corn (Krasnodar 385 MV variety), and rice (Diamant variety).

1. Study Subject: Winter Wheat (Vershin Variety)

The effect of winter wheat seed treatment with solutions of the claimed salts on the germination energy and germination rate are shown in Table IV. Table IV demonstrates that winter wheat seed treatment with solutions of the claimed salts has a positive impact on the sowing qualities thereof, such as their germination rate and the formation of normally developed sprouts, as well as a better plant survival. Absolute germination energy and germination rate values vary depending on the salt used and its concentration (dose). The germination energy and germination rate of winter wheat, however, significantly increase for all claimed salts at a concentration range of the used solutions from $1·10^{-7}$% to $1·10^{-12}$%. The highest changes were observed in the following seed treatment cases:

Ca-salt solution $1·10^{-7}$%: germination energy 90.8%, germination rate 94.3%, control 77.1% and 81.3, respectively;

Ca-salt solution $1·10^{-12}$%: germination energy 88.9%, germination rate 92.0%, control 77.1% and 81.3, respectively;

Mg-salt solution $1·10^{-11}$%: germination energy 93.1%, germination rate 96.0%, control 84.7% and 89.3, respectively;

Na-salt solution $1·10^{-9}$%: germination energy 92.3%, germination rate 95.3%, control 85.1% and 88.0, respectively;

Co-salt solution $1·10^{-10}$%: germination energy 95.6%, germination rate 98.7%, control 88.5% and 94.0, respectively;

Mn-salt solution $1·10^{-9}$%: germination energy 85.5%, germination rate 88.7%, control 73.2% and 76.0, respectively;

Cu-salt solution $1·10^{-9}$%: germination energy 94.9%, germination rate 98.0%, control 84.8% and 87.3, respectively;

Zn-salt solution $1·10^{-9}$%: germination energy 96.1%, germination rate 98.3%, control 89.0% and 94.3%, respectively.

Winter wheat seed treatment with the Ca-salt solution showed two concentration peaks ($1·10^{-7}$% and $1·10^{-12}$%), wherein both the germination energy and the germination rate were as follows: 90.8% and 88.9% for germination energy and 94.3% and 92.0% for germination rate. The highest germination energy and germination rate were observed for the following solutions: Co-salt (95.6% and 98.7%), Zn-salt (96.1% and 98.3%), and Cu-salt (94.9% and 94.3%); the lowest were for Ca-salt (90.8% and 94.3%) and Mn-salt (85.5% and 88.7%). Those data indicate that the most important salts for winter weed seeds during germination are cobalt, cupper, and zinc.

The above data describe the seed viability only at the initial stage of germination, while the germination ability at the later stage of germination is defined by the initial germinating power. The method for the determination of the germinating power comprises measuring the height of the sprouts and primary roots, as well as the biomass and the dry mass thereof per 100 seedlings. [M. A. Kartuzova. Initial Germinating Power as Method of Biological Assessment of Seed Quality. Selection and Seed Farming, #2, 1953].

Effects of seed treatment with the claimed BHMPA salt solutions on the germinating power of winter wheat are shown in Tables V-XI.

Effects of seed treatment with BHMPA Ca-salt solutions on the germinating power of winter wheat are shown in Table V. The table data demonstrate that treatment of seeds with the Ca-salt solution improves the germinating power. Larger in size (10%-36% increase) and mass (5%-50% increase) sprouts were formed in all the experiments. The highest germinating power was observed in the experiments wherein the experimental solution was used at a concentration of $1·10^{-7}$% (the root increased by 34% and the sprout by 10%, wet mass of the roots increased by 32% and the sprouts by 10%, dry mass of the roots increased by 47% and of the sprouts by 30%), and at a concentration of $1·10^{-12}$% (the root increased by 34% and the sprout by 36%, the wet mass of the roots by 40% and of the sprouts by 29%, the dry mass of the roots by 50% and of the sprouts by 37%).

Effects of seed treatment with BHMPA Mg-salt solutions on the germinating power of winter wheat are shown in Table VI. Analysis of the table data demonstrate that treatment of seeds with the Mg-salt solution significantly improves the winter wheat seed germination intensity (germinating power). Said impact greatly depended on the concentration of the solution. The highest impact of the Mg-salt on the seed germination was observed when the solution was used at a $1·10^{-11}$% concentration. In said experiment, the size and the mass of the sprouts were remarkably higher (the root increased by 31% and of the sprout by 7%, the wet mass of the roots by 33% and of the sprouts by 6%, the dry mass of the roots by 27.5% and of the sprouts by 39%). It is also noteworthy that when the seeds were treated with the experimental salt solution at a $1\cdot10^{-6}$% concentration, the results shown in Table VI were lower than those of the control.

Effects of seed treatment with BHMPA Na-salt solutions on the germinating power of winter wheat are shown in Table VII. Table VII demonstrates that treatment of winter wheat seeds with the Na-salt solution promotes growth of the sprouts. The highest impact was observed when the solution was used at a $1\cdot10^{-9}$% concentration (the length of the roots increased by 7.5% and sprouts by 13%, the wet mass of the roots by 31.5% and the sprouts by 15.6%, the dry mass of the roots by 36.5% and the sprouts by 23%). The solutions at their maximum ($1\cdot10^{-6}$%) and minimum ($1\cdot10^{-12}$%) concentrations were marginally effective.

Effects of seed treatment with BHMPA Co-salt solutions on the germinating power of winter wheat are shown in Table VIII. The table demonstrates that the biggest and strongest sprouts were formed when the concentration of the salt solution was $1\cdot10^{-10}$% (the length of the root increased by 5% and of the sprout by 15%, the wet mass of the roots by 23.5% and of the sprouts by 22%, the dry mass of the roots by 22% and of the sprouts by 49%). Notably, in other experiments ($1\cdot10^{-7}$%, $1\cdot10^{-8}$%, $1\cdot10^{-9}$%, and $1\cdot10^{-11}$%) the germinating power was significantly higher than that of the control.

Effects of seed treatment with BHMPA Mn-salt solutions on the germinating power of winter wheat are shown in Table IX. Table IX demonstrates that treatment of seeds with the Mn-salt solution greatly promoted seed germination especially, when the concentration was $1\cdot10^{-9}$% (the root length increased by 53% and the sprout by 119%, the wet mass of the roots by 97% and of the sprouts by 41%, the dry mass of the roots by 67.5% and of the sprouts by 71%) and when the concentration was $1\cdot10^{-10}$% (the root length increased by 50% and the sprout by 97%, the wet mass of the roots by 142% and of the sprouts by 28%, the dry mass of the roots by 54% and of the sprouts by 63%). Excessive concentrations impeded the growth. When the seeds were treated with the salt solution at a $1\cdot10^{-6}$% concentration, all results shown in the table were lower than those of the control.

Effects of winter wheat seed treatment with BHMPA Cu-salt solutions on germinating power are shown in Table X. Table X data demonstrate that treatment of seeds with the Cu-salt solution impacts the intensity of seed germination (growth). The impact greatly depends on the concentration of the solution. The largest in size and mass sprouts were formed when the preparation was used at a $1\cdot10^{-9}$% concentration (the root and the sprout length increased by 17%, the wet mass of the roots by 47% and of the sprouts by 36%, the dry mass of the roots by 39.5% and of the sprouts by 35%). $1\cdot10^{-6}$% and $1\cdot10^{-12}$% concentrations weren't effective.

Effects of seed treatment with BHMPA Zn-salt solutions on the germinating power of winter wheat are shown in Table XI. Table XI data demonstrate that treatment of seeds with Zn-salt solutions promote seed germination, especially, when the concentration was $1\cdot10^{-9}$% (the root length increased by 12% and the sprout by 5%, the wet mass of the roots by 38% and of the sprouts by 8%, the dry mass of the roots by 21% and of the sprouts by 28%). It is noteworthy that in other experiments, starting with the $1\cdot10^{-7}$% dose, the formed sprouts were stronger than those of the control.

To compare the claimed compounds with Melaphen (prototype), the inventors are presenting results of a comparative study of seed treatment with the claimed BHMPA salt solutions vs. Melaphen in concentrations optimum for said compounds (Tables XII-XIII). The data in Table XII shows that winter wheat seed treatment with the claimed compounds increases the germination energy and germination rate. The highest absolute numbers for the germination energy and germination rate relative to the control (86% and 93.3%) were observed in the following experiments: Melaphen $1\cdot10^{-7}$% (95.0% and 98.3%) and Cu-salt $1\cdot10^{-9}$% (94.7% and 98.7%). In other experiments, the germination energy and germination rate also exceeded those of the control and were similar to the results obtained for Melaphen.

Table XIII shows that the strongest sprouts were formed in the following experiments: Melaphen $1\cdot10^{-7}$%, Mg-salt $1\cdot10^{-11}$%, Co-salt $1\cdot10^{-10}$%, Cu-salt $1\cdot10^{-9}$%. For cobalt and copper salts, the numbers were higher than those of the prototype Melaphen. In the above experiments, the absolute values of the length of the roots and the sprouts as well as their mass (both wet and dry) were significantly higher than those of the control. In other experiments, the main indicators of the seed quality (germination energy and rate) also exceeded those of the control. Thus, the claimed salts are effective plant growth and development regulators for winter wheat, rivalling those of the prototype Melaphen.

2. Study Subject: Corn (Krasnodar 385 MV Variety)

The effect of corn seed treatment with solutions of the claimed salts on the germination energy and germination rate are shown in Table XIV. Table XIV demonstrates that absolute values for the germination energy and germination rate vary depending on the salt used and its concentration. Both germination energy and germination rate of corn, however, significantly increase for all claimed salts at the concentration range of the used solutions from $1\cdot10^{-7}$% to $1\cdot10^{-12}$%. The highest results were observed in the following experiments:

Ca-salt solution $1\cdot10^{-10}$%: germination energy 87.8%, germination rate 90.0%, control 76.7% and 79.2%, respectively;

Mg-salt solution $1\cdot10^{-9}$%: germination energy 89.71%, germination rate 95.8%, control 76.7% and 80.3%, respectively;

Na-salt solution $1\cdot10^{-10}$%: germination energy 89.7%, germination rate 93.0%, control 76.3% and 79.0%, respectively;

Co-salt solution $1\cdot10^{-7}$%: germination energy 84.3%, germination rate 90.0%, control 75.5% and 78.0%, respectively;

Mn-salt solution $1\cdot10^{-9}$%: germination energy 87.7%, germination rate 88.7%, control 76.0% and 79.7%, respectively;

Cu-salt solution $1\cdot10^{-8}$%: germination energy 91.8%, germination rate 94.2%, control 75.7% and 78.3%, respectively;

Zn-salt solution $1\cdot10^{-9}$%: germination energy 88.3%, germination rate 90.8%, control 76.0% and 79.2%, respectively Effects of seed treatment with solutions of the claimed BHMPA salts on the germinating power of corn are shown in Tables XV-XXI.

Effects of seed treatment with BHMPA Ca-salt solutions on the germinating power of corn are shown in Table XV. The table demonstrates that treatment of seeds with the Ca-salt solution improves germination. Exceptions are the $1\cdot10^{-6}$%, $1\cdot10^{-7}$% and $1\cdot10^{-12}$% concentrations, wherein the difference from the control is rather insignificant. The highest germinating power was observed in the experiments wherein the experimental solution was used at a concentration of $1\cdot10^{-10}$% (the length of the root increased by 20% and of the sprout by 23%, the wet mass of the roots by 31% and of the sprouts by 26%, the dry mass of the roots by 21% and of the sprouts by 78%). Said concentration was optimum for the calcium salt of BHMPA used to treat corn seeds before sowing.

Effects of seed treatment with BHMPA Mg-salt solutions on the germinating power of corn are shown in Table XVI. Table XVI demonstrates that treatment of seeds with the experimental Mg-salt solutions promotes germination and improves their germinating power. To a greater degree, the biggest impact on the plantlings was seen in the increased germinating power of the roots (21%-72% increase) rather than the sprouts (the length changes varied from −15% to +15%). The highest impact on the strength and viability of the plantlings was observed at a $1 \cdot 10^{-9}$% concentration (the length of the roots increased by 72%, of the sprout by 15%, the wet mass of the roots by 42% and of the sprouts by 61%, the dry mass of the roots by 38% and of the sprouts by 32%). Said combined results show that for treating corn seeds, this concentration is optimum for the magnesium salt of BHMPA.

Effects of corn seed treatment with BHMPA Na-salt solutions on their germinating power are shown in Table XVII. Table XVII data demonstrate that the highest positive impact was observed when the treatment was done with the Na-salt of BHMPA solution at a $1 \cdot 10^{-10}$% concentration (the length of the root increased by 17% and of the sprout by 11%, the wet mass of the roots by 6% and of the sprouts by 17%, the dry mass of the roots by 6.5% and of the sprouts by 55.5%). Said combined results show that for treating corn seeds, this concentration is optimum for the sodium salt of BHMPA. $1 \cdot 10^{-6}$% and $1 \cdot 10^{-12}$% concentrations are ineffective.

Effects of corn seed treatment with BHMPA Co-salt solutions on their germinating power are shown in Table XVIII. The table demonstrates that at $1 \cdot 10^{-11}$% and $1 \cdot 10^{-12}$% concentrations, there is no increase in the germination intensity; there is no significant difference between the control and the experimental samples. The rest of the samples show a significant increase in the germinating power of the plantlings over the control. The biggest difference in the results for the control and the experimental samples was observed at a $1 \cdot 10^{-7}$% concentration (the length of the root increased by 32% and of the sprout by 27%, the wet mass of the roots by 20% and of the sprouts by 60%, the dry mass of the roots by 15% and of the sprouts by 25%). Said combined results show that the cobalt salt of BHMPA at a $1 \cdot 10^{-7}$% concentration is optimum for treating corn seeds.

Effects of seed treatment with BHMPA Mn-salt solutions on the germinating power of corn are shown in Table XIX. Table XIX data show that $1 \cdot 10^{-6}$%, $1 \cdot 10^{-7}$%, $1 \cdot 10^{-11}$%, and $1 \cdot 10^{-12}$% solution concentrations are ineffective; and furthermore, they inhibit the germinating power of corn seeds. The optimum concentration of the manganese salt of BHMPA solution for treating corn seeds is $1 \cdot 10^{-9}$% (the root length increased by 21% and the sprout by 15%, the wet mass of the roots by 43% and of the sprouts by 30%, the dry mass of the roots by 31% and of the sprouts by 58%).

Effects of seed treatment with BHMPA Cu-salt solutions on the germinating power of corn are shown in Table XX. Table XX demonstrates that treatment of corn seeds with the Cu-salt solution increases germination. The sample with the lowest concentration ($1 \cdot 10^{-12}$%) is one exception. The highest germinating power was observed at a $1 \cdot 10^{-8}$% concentration (the length of the root increased by 16% and of the sprout by 37%, the wet mass of the roots increased by 31% and of the sprouts by 41%, the dry mass of the roots increased by 28.5% and of the sprouts by 18%). Said concentration, therefore, is optimum for the copper salt of BHMPA solution for treating corn seeds before sowing.

Effects of seed treatment with BHMPA Zn-salt solutions on the germinating power of corn are shown in Table XXI. Table XXI results demonstrate that treatment of seeds with the BHMPA Zn-salt solution promotes germination; the lowest concentration of $1 \cdot 10^{-12}$% is one exception. Maximum results in Table XXI were observed at a $1 \cdot 10^{-8}$% concentration (the root length increased by 25.5% and the sprout by 21%, the wet mass of the roots increased by 27% and of the sprouts by 38%, the dry mass of the roots and sprouts increased by 31%). Said concentration, therefore, is deemed optimum for the zinc salt of BHMPA solution for treating corn seeds before sowing.

Comparative study results of corn seed treatment with the claimed BHMPA and biogenic metal salt solutions in optimum concentrations vs. Melaphen (prototype) are shown in Tables XXII and XXIII.

Results shown in Table XXII demonstrate that treatment of corn seeds with the claimed BHMPA salts in optimum concentrations for each of said salts before sowing increases germination energy (85.0%-92.0%, in control—82.3%) and germination rate (94.0.0%-97.7%, in control—92.3%) of the seeds. For Melaphen, germination energy was 90.7% and germination rate was 97.7%.

Results shown in Table XXIII demonstrate that treatment of corn seeds with the experimental preparations before sowing intensified their germination. The root length increased by 12%-44% and the sprout length by 15%-55%, the root biomass increased by 5%-37% and the sprout biomass by 14%-44%, the dry mass of the roots increased by 6%-35% and the sprouts by 4%-30%. The most significant length and mass gains of the sprouts were observed in the following samples: Melaphen ($1 \cdot 10^{-7}$%), BHMPA Co-salt ($1 \cdot 10^{-7}$%), BHMPA Mg-salt ($1 \cdot 10^{-9}$%), BHMPA Cu-salt ($1 \cdot 10^{-8}$%), and BHMPA Zn-salt ($1 \cdot 10^{-8}$%). Such increased germinating power promotes the formation of sturdy sprouts, which can later grow into robust plants. In their effect on the intensity of corn germination, the claimed salts are no less effective than Melaphen.

3. Study Subject: Rice (Diamant Variety)

The effect of rice seed treatment with the claimed salt solutions on germination energy and germination rate are shown in Table XXIV. Table XXIV demonstrates that absolute germination energy and germination rate values vary depending on the salt used and its concentration. The germination energy and germination rate of rice, however, significantly increase for all claimed salts in the $1 \cdot 10^{-8}$ to $1 \cdot 10^{-12}$% concentration range of the used solutions.

The highest changes were observed in the following cases:

Ca-salt solution $1 \cdot 10^{-10}$%: germination energy 85.0%, germination rate 92.0%, control 77.3% and 81.3, respectively;

Mg-salt solution $1 \cdot 10^{-10}$%: germination energy 86.3%, germination rate 92.7%, control 78.0% and 82.7, respectively;

Na-salt solution $1 \cdot 10^{-11}$%: germination energy 84.0%, germination rate 90.3%, control 76.3% and 81.7, respectively;

Co-salt solution $1 \cdot 10^{-9}$%: germination energy 86.3%, germination rate 93.7%, control 78.3% and 83.3%, respectively;

Mn-salt solution $1 \cdot 10^{-9}$%: germination energy 85.3%, germination rate 91.7%, control 77.7% and 83.0, respectively;

Cu-salt solution $1 \cdot 10^{-10}$%: germination energy 84.7%, germination rate 96.7%, control 79.7% and 86.3, respectively;

Zn-salt solution $1 \cdot 10^{-9}$%: germination energy 88.7%, germination rate 96.0%, control 81.0% and 87.7%, respectively.

Effects of seed treatment with claimed BHMPA salt solutions on the germinating power are shown in Tables XXV-XXXI.

Effects of seed treatment with BHMPA Ca-salt solutions on the germinating power are shown in Table XXV. The table demonstrates that Ca-salt of BHMPA solutions improve the growth of rice plantlings. The highest quality seeds were obtained when the concentration was $1 \cdot 10^{-9}$% (the length of the root increased by 27% and of the sprout by 28%, the wet mass of the roots and sprouts by 34%, the dry mass of the roots by 76% and of the sprouts by 52%), and thus, that concentration was deemed optimum.

Effects of seed treatment with BHMPA Mg-salt solutions on the germinating power are shown in Table XXVI. The study results (Table XXVI) demonstrate that pre-sowing treatment of seeds with BHMPA Mg-salt solutions resulted in the formation of plantlings with longer length and larger mass. The highest impact on the germinating power was observed with the solution at a $1 \cdot 10^{-10}$% concentration (the length of the roots increased by 36%, of the sprout by 41%, the wet mass of the roots by 63% and of the sprouts by 41.5%, the dry mass of the roots by 59% and of the sprouts by 69%). Thus, this concentration of the magnesium salt of BHMPA was deemed optimum for treating rice seeds before sowing.

Effects of seed treatment with BHMPA Na-salt solutions on the germinating power of rice are shown in Table XXVII. Table XXVII data demonstrate that treatment of rice seeds with the Na-salt of BHMPA solutions induces seed germination, particularly, at a $1 \cdot 10^{-11}$% concentration (the length of the root increased by 23% and of the sprout by 90%, the wet mass of the roots by 48% and of the sprouts by 40%, the dry mass of the roots and the sprouts by 50%). Thus, this concentration of the sodium salt of BHMPA was deemed optimum for treating rice seeds before sowing. Noteworthy, in other cases also, both length and mass (dry and wet) of the roots and sprouts were significantly higher than those of the control.

Effects of seed treatment with BHMPA Co-salt solutions on the germinating power of rice are shown in Table XXVIII. Table XXVIII data demonstrate that treating rice seeds with BHMPA Co-salt solutions at any of the experimental concentrations increases their germination intensity. The strongest and sturdiest plantlings were formed at a $1 \cdot 10^{-9}$% concentration (the length of the roots increased by 32% and of the sprout by 52%, the wet mass of the roots by 40% and of the sprouts by 41%, the dry mass of the roots by 53% and of the sprouts by 75%). Thus, this concentration of the cobalt salt of BHMPA was deemed optimum for treating rice seeds before sowing.

Effects of seed treatment with BHMPA Mn-salt solutions on the germinating power of rice are shown in Table XXIX. Table XXIX data demonstrate that using BHMPA Mn-salts significantly increases germination energy and germination rate. The strongest and sturdiest plantlings were formed at a $1 \cdot 10^{-9}$% concentration (the length of the roots increased by 13% and of the sprout by 32%, the wet mass of the roots by 47% and of the sprouts by 40%, the dry mass of the roots by 60% and of the sprouts by 69%). Thus, this concentration of the manganese salt of BHMPA was deemed optimum for treating rice seeds before sowing.

Effects of seed treatment with BHMPA Cu-salt solutions on the germinating power of rice are shown in Table XXX. Table XXX data demonstrate that treatment of rice seeds with the Cu-salt of BHMPA solution improves germinating power, especially, at a $1 \cdot 10^{-10}$% concentration (the length of the roots increased by 18% and of the sprout by 21%, the wet mass of the roots by 49% and of the sprouts by 53%, the dry mass of the roots by 59% and of the sprouts by 56.5%). Thus, this concentration of the copper salt of BHMPA was deemed optimum for treating rice seeds before sowing.

Effects of seed treatment with BHMPA Zn-salt solutions on the germinating power of rice are shown in Table XXXI. Table XXI data demonstrate that treating seeds with the Zn-salt of BHMPA solution significantly promotes germination. The highest increase in length and mass of the plantlings was observed at a $1 \cdot 10^{-9}$% concentration (the root length increased by 30% and the sprout by 50%, the wet mass of the roots by 57% and of the sprouts by 58%, the dry mass of the roots by 59% and of the sprouts by 50%). Thus, this concentration of the zinc salt of BHMPA was deemed optimum for treating rice seeds before sowing.

Comparative study results of rice seed treatment with the claimed BHMPA and biogenic metal salt solutions in optimum concentrations vs. Melaphen (prototype) are shown in Tables XXXII and XXXIII.

Table XXXII demonstrates that the most effective preparations are: Melaphen $1 \cdot 10^{-8}$% (germination energy 89.5%, germination rate 96.3%), BHMPA Zn-salts $1 \cdot 10^{-8}$% (germination energy 89.5%, germination rate 96.5%), and Cu-salts $1-10^{-8}$% (germination energy 88.0%, germination rate 96.0%).

Plantling growth indicators (root and sprout length and mass, both wet and dry), which reflect the germinating power of the seeds, are shown in Table XXXIII. Table XXXIII data demonstrate that all experiments yield more robust plantlings, which significantly exceed the control in both length and mass (increased root length by 23%-58%, increased sprout length by 27%-88%, increased wet mass of the roots by 34%-50% and of the sprouts by 48%-73.5%, increased dry mass of the roots by 5%-38% and of the sprouts by 8%-40%). The most robust plantlings, which guarantee even and sturdy crops, were obtained in the following experiments: Melaphen (prototype) at a $1 \cdot 10^{-8}$% concentration and BHMPA Zn-salts at a $1 \cdot 10^{-8}$% concentration.

Results in Tables XXXII and XXXIII demonstrate that in their rice growth-regulating ability, the claimed salts of biogenic metals (Ca, Mg, Na, Co, Mn, Cu, Zn) with BHMPA are no less effective than or comparable to Melaphen.

Field Study Results.

Field studies were conducted for the BHMPA Mg-salt. The effect of treatment winter wheat seeds (Kazan 560 variety) with BHMPA Mg-salt solutions on the yield and quality of the grain was examined. The field experiment was conducted at a branch of a fallow rotation. The seeds were sowed on Sep. 1, 2015, in an area covering 1.7 hectares of the experimental field located at the experimental base of Tatarstan Research Institute of Agriculture. For comparison, the seeds were treated with the BHMPA Mg-salt solution and the known growth-regulator Melaphen at the same concentrations, optimum for Melaphen.

The experiment was conducted for the following variants:
1. Control (no seed treatment);
2. Seed treatment with the BHMPA Mg-salt solution at a $1\cdot10^{-7}\%$ concentration;
3. Seed treatment with the BHMPA Mg-salt solution at a $1\cdot10^{-7}\%$ concentration+spraying with the BHMPA Mg-salt solution at a $1\cdot10^{-8}\%$ concentration upon vegetation during spring tillering and earing phases;
4. Seed treatment with the growth regulator Melaphen at a $1\cdot10^{-7}\%$ concentration;
5. Seed treatment with Melaphen at a $1\cdot10^{-7}\%$ concentration and spraying with Melaphen at a $1\cdot10^{-8}\%$ concentration upon vegetation during spring tillering and earing phases.

The seeds were treated with the experimental compounds together with a seed disinfectant at a rate of 10 ml/T. The vegetating plants were treated at a rate of 5 ml/ha. Identical field operations appropriate for that zone as well as plant protection measures against weeds and disease, were applied in all cases.

The obtained results are presented in Table XXXIV. Table XXXIV shows that pre-sowing treatment of winter wheat seeds with BHMPA Mg-salt solutions results in a better germination rate compared to the control (up to 70%, control–67%) and plant viability (up to 55%, in control—41%). Additional spraying during spring tillering and earing phases improves the plant viability up to 61%, which is compatible to Melaphen. Magnesium salts improve the quality and yield of the seeds: the number of grains and grain mass per head increased. Accordingly, the yield of winter wheat also increased. The highest yield increase was observed when the seeds were treated with the BHMPA Mg-salt at a $1\cdot10^{-7}\%$ concentration and sprayed with the $1\cdot10^{-8}\%$ concentration—30.7 dt/ha, in control—21.7 dt/ha, in an analogous variant with Melaphen—29.3 dt/ha).

Results of field experiments with BHMPA Mg-salt as the main growth-regulating component of said pre-sowing seed treatment combined with additional treatment of winter wheat plants with other claimed BHMPA salts, are presented in Table XXXV.

Tables XXXIV and XXXV demonstrate that the quality and yield of winter wheat seeds increase when pre-soaking of seeds in the experimental salt solution is combined with additional treatment of plants with any of the experimental BHMPA salt solutions at the tillering and earing phases.

Study results conducted on winter wheat, corn, and rice, therefore, lead to the conclusion that the claimed BHMPA salts with biogenic metals (Ca, Mg, Na, Co, Mn, Cu, Zn) exhibit growth-regulating ability, improve the germination energy and germination capacity of seeds, and increase their germination intensity (germinating power), i.e. cumulative quality parameters of the seeds. The working doses of the claimed compounds are in the $1\cdot10^{-7}\%$-$1\cdot10^{-12}\%$ range. The optimum concentrations of the claimed compounds used for pre-sowing treatment of seeds are in the $1\cdot10^{-9}\%$-$1\cdot10^{-12}\%$ range, which qualifies the claimed BHMPA salts as growth-regulating preparations compatible to natural phytohormones in their efficacy. BHMPA is a weaker growth-regulating agent, less effective than the prototype Melaphen.

Comparison of the claimed salts and Melaphen revealed that in optimum concentrations, their effect on the sowing qualities of seeds is as good as that of Melaphen. The experiment with the magnesium salt of BHMPA demonstrates that pre-sowing treatment of seeds with said salt solution improves the yield and quality of winter wheat seeds similarly to the known growth regulator Melaphen. The claimed compounds expand the available pool of plant growth and development regulators effective at extremely low concentrations $1\cdot10^{-7}\%$-$1\cdot10^{-12}\%$, while enriching the seeds with necessary microelements.

The claimed compounds show definite advantages over the plant growth and development regulators currently on the market due to the simplicity of preparation, high yield from commercially available products, and efficacy thereof at extremely low concentrations, which makes the final products environmentally friendly, as well as their solubility in water and storage stability. All those factors make them good candidates for agricultural application.

TABLE I

Effect of spring wheat seed treatment with bis-(hydroxymethyl)-phosphinic acid solutions on germination rate and plant height

| Variant | Germination rate % | | Plant height |
| --- | --- | --- | --- |
| | $4^{th}$ day | $8^{th}$ day | cm |
| Control | 30.0 | 80.0 | 11.3 |
| BHMPA $1\cdot10^{-7}\%$ | 28.0 | 70.0 | 14.1 |
| BHMPA $1\cdot10^{-9}\%$ | 33.0 | 81.5 | 14.3 |
| BHMPA $1\cdot10^{-12}\%$ | 32.5 | 81.3 | 14.4 |
| Melaphen $1\cdot10^{-7}\%$ | 54.0 | 82.0 | 14.8 |
| Melaphen $1\cdot10^{-9}\%$ | 52.0 | 81.0 | 14.5 |

TABLE II

Effect of treatment with bis-(hydroxymethyl)-phosphinic acid solutions on phytopathological properties of treated spring wheat seeds

| Variant | | Overall contamination, % | By type | | | Biological efficacy % |
| --- | --- | --- | --- | --- | --- | --- |
| | | | mold | alternaria | bacteriosis | |
| Control | | 59.0 | 3 | 54 | 2 | — |
| Concentration of experimental solution % | $1\cdot10^{-7}\%$ | 33.0 | 3 | 24 | 6 | 44.1 |
| | $1\cdot10^{-8}\%$ | 34.0 | 2 | 26 | 6 | 42.4 |
| | $1\cdot10^{-9}\%$ | 21.0 | 3 | 14 | 4 | 64.4 |
| | $1\cdot10^{-10}\%$ | 23.0 | 3 | 16 | 4 | 61.0 |
| | $1\cdot10^{-11}\%$ | 46.0 | 2 | 42 | 2 | 22.0 |
| | $1\cdot10^{-12}\%$ | 33.0 | 2 | 28 | 3 | 44.1 |

TABLE III

Effect of winter wheat seed treatment with bis-(hydroxymethyl)-phosphinic acid solutions on germination energy, germination rate, and plant height

| Variant | | Germination energy % | Germination rate % | Plant height cm | Number of roots | Root length cm |
|---|---|---|---|---|---|---|
| Control | | 86.0 | 94.0 | 10.4 | 3.0 | 11.9 |
| Concentration of experimental solution % | $1 \cdot 10^{-7}\%$ | 82.5 | 84.0 | 11.3 | 3.3 | 11.7 |
| | $1 \cdot 10^{-8}\%$ | 86.0 | 86.0 | 12.5 | 3.1 | 12.1 |
| | $1 \cdot 10^{-9}\%$ | 87.4 | 96.0 | 13.6 | 3.4 | 12.3 |
| | $1 \cdot 10^{-10}\%$ | 85.7 | 90.0 | 11.2 | 3.2 | 11.5 |
| | $1 \cdot 10^{-11}\%$ | 83.9 | 92.0 | 12.4 | 3.3 | 11.3 |
| | $1 \cdot 10^{-12}\%$ | 90.0 | 95.0 | 14.1 | 3.3 | 11.9 |

TABLE IV

Effect of winter wheat seed treatment with biogenic metal salts of bis-(hydroxymethyl)-phosphinic acid on germination energy and germination rate, %

| | Ca | | Mg | | Na | |
|---|---|---|---|---|---|---|
| Concentration % | Germination energy | Germination rate | Germination energy | Germination rate | Germination energy | Germination rate |
| Control | 77.1 | 81.3 | 84.7 | 89.3 | 85.1 | 88.0 |
| $1 \cdot 10^{-6}\%$ | 85.3 | 88.0 | 85.0 | 89.3 | 84.4 | 86.0 |
| $1 \cdot 10^{-7}\%$ | 90.8 | 94.3 | 88.4 | 92.0 | 86.7 | 89.0 |
| $1 \cdot 10^{-8}\%$ | 80.9 | 84.0 | 88.8 | 92.0 | 90.2 | 94.0 |
| $1 \cdot 10^{-9}\%$ | 81.2 | 85.3 | 89.3 | 93.0 | 92.3 | 95.3 |
| $1 \cdot 10^{-10}\%$ | 86.1 | 88.0 | 89.9 | 93.3 | 88.4 | 92.0 |
| $1 \cdot 10^{-11}\%$ | 87.0 | 89.3 | 93.1 | 96.0 | 85.0 | 88.0 |
| $1 \cdot 10^{-12}\%$ | 88.9 | 92.0 | 90.0 | 93.3 | 83.2 | 86.3 |

| | Co | | Mn | |
|---|---|---|---|---|
| Concentration % | Germination energy | Germination rate | Germination energy | Germination rate |
| Control | 88.5 | 94.0 | 73.2 | 76.0 |
| $1 \cdot 10^{-6}\%$ | 89.2 | 93.0 | 72.0 | 69.3 |
| $1 \cdot 10^{-7}\%$ | 91.4 | 94.0 | 73.6 | 76.0 |
| $1 \cdot 10^{-8}\%$ | 92.8 | 96.0 | 77.9 | 82.7 |
| $1 \cdot 10^{-9}\%$ | 94.3 | 97.3 | 85.5 | 88.7 |
| $1 \cdot 10^{-10}\%$ | 95.6 | 98.7 | 83.0 | 85.3 |
| $1 \cdot 10^{-11}\%$ | 94.7 | 97.3 | 76.1 | 78.8 |
| $1 \cdot 10^{-12}\%$ | 92.0 | 94.7 | 71.6 | 74.0 |

| | Cu | | Zn | |
|---|---|---|---|---|
| Concentration % | Germination energy | Germination rate | Germination energy | Germination rate |
| Control | 84.8 | 87.3 | 89.0 | 94.3 |
| $1 \cdot 10^{-6}\%$ | 81.0 | 84.0 | 91.9 | 95.3 |
| $1 \cdot 10^{-7}\%$ | 87.3 | 90.0 | 92.7 | 96.0 |
| $1 \cdot 10^{-8}\%$ | 91.4 | 96.0 | 94.1 | 97.3 |
| $1 \cdot 10^{-9}\%$ | 94.9 | 98.0 | 96.1 | 98.3 |
| $1 \cdot 10^{-10}\%$ | 92.1 | 96.7 | 95.4 | 97.3 |
| $1 \cdot 10^{-11}\%$ | 91.7 | 94.0 | 93.2 | 96.0 |
| $1 \cdot 10^{-12}\%$ | 87.5 | 90.0 | 92.3 | 96.0 |

TABLE V

Effect of winter wheat seed treatment with Ca-salt solutions of bis-(hydroxymethyl)-phosphinic acid on germinating power

| Variant | | Length, cm/+ % to control | | Mass, g/100 plantlings/+ % to control | | | |
|---|---|---|---|---|---|---|---|
| | | | | wet | | dry | |
| | | root | sprout | root | sprout | root | sprout |
| Control | | 5.5 | 5.8 | 3.71 | 5.08 | 0.32 | 0.43 |
| Concentration of experimental solution % | $1 \cdot 10^{-6}$% | 7.1 | 6.9 | 4.16 | 5.32 | 0.45 | 0.47 |
| | | 27% | 19% | 12% | 5% | 41% | 9% |
| | $1 \cdot 10^{-7}$% | 7.4 | 7.4 | 4.89 | 5.57 | 0.47 | 0.55 |
| | | 34% | 27% | 32% | 10% | 47% | 30% |
| | $1 \cdot 10^{-8}$% | 6.5 | 6.4 | 4.08 | 5.32 | 0.39 | 0.45 |
| | | 18% | 10% | 10% | 5% | 22% | 5% |
| | $1 \cdot 10^{-9}$% | 6.5 | 6.5 | 4.20 | 5.36 | 0.41 | 0.48 |
| | | 18% | 12% | 13% | 5.5% | 28% | 12% |
| | $1 \cdot 10^{-10}$% | 6.6 | 6.5 | 4.34 | 5.41 | 0.45 | 0.53 |
| | | 20% | 12% | 17% | 6.5% | 41% | 23% |
| | $1 \cdot 10^{-11}$% | 7.2 | 6.9 | 4.70 | 5.50 | 0.46 | 0.54 |
| | | 31% | 19% | 27% | 8% | 44% | 25.5% |
| | $1 \cdot 10^{-12}$% | 7.4 | 7.9 | 5.19 | 6.55 | 0.48 | 0.59 |
| | | 34% | 36% | 40% | 29% | 50% | 37% |
| $HCP_{05}$ | | 0.2 | 0.2 | 0.29 | 0.20 | 0.01 | 0.02 |

TABLE VI

Effect of winter wheat seed treatment with Mg-salt solutions of bis-(hydroxymethyl)-phosphinic acid on germinating power

| Variant | | Length, cm/+ % to control | | Mass, g/100 plantlings/+ % to control | | | |
|---|---|---|---|---|---|---|---|
| | | | | wet | | dry | |
| | | root | sprout | root | sprout | root | sprout |
| Control | | 9.3 | 7.2 | 2.57 | 5.59 | 0.58 | 0.77 |
| Concentration of experimental solution % | $1 \cdot 10^{-6}$% | 9.2 | 7.1 | 2.55 | 5.45 | 0.57 | 0.65 |
| | | −1% | −1% | −1% | −2.5% | −2% | −15% |
| | $1 \cdot 10^{-7}$% | 10.0 | 7.2 | 2.68 | 5.63 | 0.61 | 0.79 |
| | | 7.5% | 0% | 3% | 0.7% | 5% | 2.6% |
| | $1 \cdot 10^{-8}$% | 10.0 | 7.4 | 2.97 | 5.79 | 0.62 | 0.80 |
| | | 7.5% | 3% | 15.5% | 3.6% | 7% | 4% |
| | $1 \cdot 10^{-9}$% | 10.9 | 7.5 | 2.98 | 5.81 | 0.63 | 0.81 |
| | | 17% | 4% | 16% | 4% | 8.6% | 5% |
| | $1 \cdot 10^{-10}$% | 11.3 | 7.5 | 2.94 | 5.84 | 0.66 | 0.83 |
| | | 21.5% | 4% | 14% | 4.5% | 24% | 8% |
| | $1 \cdot 10^{-11}$% | 12.2 | 7.7 | 3.41 | 5.94 | 0.74 | 1.07 |
| | | 31% | 7% | 33% | 6% | 27.5% | 39% |
| | $1 \cdot 10^{-12}$% | 12.1 | 7.6 | 3.11 | 5.86 | 0.69 | 0.84 |
| | | 30% | 5.5% | 21% | 5% | 19% | 9% |
| $HCP_{05}$ | | 0.4 | 0.3 | 0.12 | 0.20 | 0.02 | 0.03 |

TABLE VII

Effect of winter wheat seed treatment with Na-salt solutions of bis-(hydroxymethyl)-phosphinic acid on germinating power

| Variant | | Length, cm/+ % to control | | Mass, g/100 plantlings/+ % to control | | | |
|---|---|---|---|---|---|---|---|
| | | | | wet | | dry | |
| | | root | sprout | root | sprout | root | sprout |
| Control | | 5.3 | 6.1 | 2.44 | 4.68 | 0.41 | 0.56 |
| Concentration of experimental solution % | $1 \cdot 10^{-6}$% | 5.0 | 6.0 | 2.35 | 4.51 | 0.37 | 0.54 |
| | | −5.7% | −1.6% | −3.7% | −3.6% | −10% | −3.6% |
| | $1 \cdot 10^{-7}$% | 5.3 | 6.3 | 2.58 | 5.03 | 0.45 | 0.56 |
| | | 0% | 3.3% | 5.7% | 7.5% | 10% | 0% |

TABLE VII-continued

Effect of winter wheat seed treatment with Na-salt solutions of bis-(hydroxymethyl)-phosphinic acid on germinating power

| | Length. cm/+ % to control | | Mass, g/100 plantlings/+ % to control | | | |
|---|---|---|---|---|---|---|
| | | | wet | | dry | |
| Variant | root | sprout | root | sprout | root | sprout |
| $1 \cdot 10^{-8}\%$ | 5.6 | 6.7 | 2.73 | 5.37 | 0.47 | 0.63 |
| | 5.7% | 10% | 12% | 15% | 14.6% | 12.5% |
| $1 \cdot 10^{-9}\%$ | 5.7 | 6.9 | 3.21 | 5.41 | 0.56 | 0.69 |
| | 7.5% | 13% | 31.5% | 15.6% | 36.5% | 23% |
| $1 \cdot 10^{-10}\%$ | 5.6 | 6.5 | 2.66 | 5.33 | 0.46 | 0.61 |
| | 5.7% | 6.5% | 9% | 14% | 12% | 9% |
| $1 \cdot 10^{-11}\%$ | 5.5 | 6.4 | 2.57 | 5.11 | 0.43 | 0.60 |
| | 3.8% | 5% | 5.3% | 9% | 5% | 7% |
| $1 \cdot 10^{-12}\%$ | 5.4 | 6.3 | 2.41 | 5.03 | 0.42 | 0.58 |
| | 2% | 3.3% | −1.2% | 7.5% | 2% | 3.6% |
| $HCP_{05}$ | 0.2 | 0.2 | 0.11 | 0.17 | 0.02 | 0.02 |

TABLE VIII

Effect of winter wheat seed treatment with Co-salt solutions of bis-(hydroxymethyl)-phosphinic acid on germinating power

| | | Length. cm/+ % to control | | Mass, g/100 plantlings/+ % to control | | | |
|---|---|---|---|---|---|---|---|
| | | | | wet | | dry | |
| | Variant | root | sprout | root | sprout | root | sprout |
| | Control | 6.3 | 5.3 | 2.89 | 3.42 | 0.46 | 0.45 |
| Concentration of experimental solution % | $1 \cdot 10^{-6}\%$ | 6.0 | 5.1 | 2.99 | 3.30 | 0.43 | 0.41 |
| | | −5% | −4% | 3.5% | −3.5% | −6.5% | −9% |
| | $1 \cdot 10^{-7}\%$ | 6.3 | 5.4 | 3.06 | 3.47 | 0.50 | 0.45 |
| | | 0% | 2% | 6% | 1.5% | 9% | 0% |
| | $1 \cdot 10^{-8}\%$ | 6.4 | 5.5 | 3.29 | 3.74 | 0.54 | 0.53 |
| | | 1.6% | 4% | 14% | 9% | 17% | 18% |
| | $1 \cdot 10^{-9}\%$ | 6.5 | 5.7 | 3.35 | 4.04 | 0.55 | 0.57 |
| | | 3% | 7.5% | 16% | 18% | 19.5% | 27% |
| | $1 \cdot 10^{-10}\%$ | 6.6 | 6.1 | 3.57 | 4.18 | 0.56 | 0.67 |
| | | 5% | 15% | 23.5% | 22% | 22% | 49% |
| | $1 \cdot 10^{-11}\%$ | 6.5 | 5.9 | 3.33 | 3.78 | 0.54 | 0.56 |
| | | 3% | 11% | 15% | 10.5% | 17% | 24% |
| | $1 \cdot 10^{-12}\%$ | 6.2 | 5.4 | 3.06 | 3.49 | 0.52 | 0.48 |
| | | −1.5% | 2% | 6% | 2% | 13% | 7% |
| | $HCP_{05}$ | 0.2 | 0.2 | 0.11 | 0.13 | 0.02 | 0.02 |

TABLE IX

Effect of winter wheat seed treatment with Mn-salt solutions of bis-(hydroxymethyl)-phosphinic acid on germinating power

| | | Length. cm/+ % to control | | Mass, g/100 plantlings/+ % to control | | | |
|---|---|---|---|---|---|---|---|
| | | | | wet | | dry | |
| | Variant | root | sprout | root | sprout | root | sprout |
| | Control | 3.0 | 3.6 | 1.52 | 3.60 | 0.37 | 0.49 |
| Concentration of experimental solution % | $1 \cdot 10^{-6}\%$ | 2.8 | 3.4 | 1.38 | 3.37 | 0.32 | 0.44 |
| | | −7% | −5.5% | −9% | −6% | −2% | −10% |
| | $1 \cdot 10^{-7}\%$ | 3.8 | 4.8 | 1.74 | 3.84 | 0.50 | 0.58 |
| | | 27% | 33% | 14.5% | 7% | 35% | 18% |
| | $1 \cdot 10^{-8}\%$ | 4.4 | 6.0 | 2.09 | 4.52 | 0.53 | 0.67 |
| | | 47% | 67% | 37.5% | 25.5% | 43% | 37% |
| | $1 \cdot 10^{-9}\%$ | 4.6 | 7.9 | 3.00 | 5.09 | 0.62 | 0.84 |
| | | 53% | 119% | 97% | 41% | 67.5% | 71% |

TABLE IX-continued

Effect of winter wheat seed treatment with Mn-salt solutions of bis-(hydroxymethyl)-phosphinic acid on germinating power

| Variant | Length, cm/+ % to control | | Mass, g/100 plantlings/+ % to control | | | |
|---|---|---|---|---|---|---|
| | | | wet | | dry | |
| | root | sprout | root | sprout | root | sprout |
| $1 \cdot 10^{-10}\%$ | 4.5 | 7.1 | 2.16 | 4.60 | 0.57 | 0.80 |
| | 50% | 97% | 142% | 28% | 54% | 63% |
| $1 \cdot 10^{-11}\%$ | 4.4 | 6.1 | 1.90 | 4.00 | 0.52 | 0.75 |
| | 47% | 69% | 34% | 11% | 40.5% | 53% |
| $1 \cdot 10^{-12}\%$ | 3.6 | 5.2 | 1.52 | 3.48 | 0.40 | 0.69 |
| | 20% | 44% | 0% | −3% | 8% | 31% |
| $HCP_{05}$ | 0.1 | 0.2 | 0.08 | 0.15 | 0.02 | 0.02 |

TABLE X

Effect of winter wheat seed treatment with Cu-salt solutions of bis-(hydroxymethyl)-phosphinic acid on germinating power

| | Variant | Length, cm/+ % to control | | Mass, g/100 plantlings/+ % to control | | | |
|---|---|---|---|---|---|---|---|
| | | | | wet | | dry | |
| | | root | sprout | root | sprout | root | sprout |
| | Control | 4.8 | 4.0 | 2.81 | 2.66 | 0.43 | 0.37 |
| Concentration of experimental solution % | $1 \cdot 10^{-6}\%$ | 4.6 | 3.8 | 2.61 | 2.70 | 0.41 | 0.35 |
| | | −4% | −5% | −7% | 1.5% | −2% | −5% |
| | $1 \cdot 10^{-7}\%$ | 4.9 | 4.0 | 3.35 | 3.05 | 0.44 | 0.40 |
| | | 2% | 0% | 19% | 15% | 2% | 8% |
| | $1 \cdot 10^{-8}\%$ | 5.1 | 4.1 | 3.68 | 3.22 | 0.47 | 0.46 |
| | | 6% | 2.5% | 31% | 21% | 9% | 24% |
| | $1 \cdot 10^{-9}\%$ | 5.6 | 4.7 | 4.13 | 3.61 | 0.60 | 0.50 |
| | | 17% | 17.5% | 47% | 36% | 39.5% | 35% |
| | $1 \cdot 10^{-10}\%$ | 5.3 | 4.4 | 3.75 | 3.34 | 0.49 | 0.48 |
| | | 10% | 10% | 33.5% | 25.5% | 14% | 30% |
| | $1 \cdot 10^{-11}\%$ | 5.1 | 4.1 | 3.44 | 3.20 | 0.46 | 0.46 |
| | | 6% | 2.5% | 11% | 20% | 7% | 24% |
| | $1 \cdot 10^{-12}\%$ | 4.8 | 4.0 | 3.01 | 2.92 | 0.41 | 0.42 |
| | | 0% | 0% | 7% | 10% | −2% | 13.5% |
| | $HCP_{05}$ | 0.2 | 0.1 | 0.12 | 0.11 | 0.02 | 0.01 |

TABLE XI

Effect of winter wheat seed treatment with Zn-salt solutions of bis-(hydroxymethyl)-phosphinic acid on germinating power

| | Variant | Length, cm/+ % to control | | Mass, g/100 plantlings/+ % to control | | | |
|---|---|---|---|---|---|---|---|
| | | | | wet | | dry | |
| | | root | sprout | root | sprout | root | sprout |
| | Control | 9.7 | 7.2 | 2.59 | 4.76 | 0.57 | 0.64 |
| Concentration of experimental solution % | $1 \cdot 10^{-6}\%$ | 9.1 | 6.9 | 2.58 | 4.73 | 0.60 | 0.61 |
| | | −6% | −4% | 0% | −1% | 5% | −4% |
| | $1 \cdot 10^{-7}\%$ | 10.2 | 7.3 | 2.61 | 4.88 | 0.62 | 0.70 |
| | | 5% | 1% | 1% | 2.5% | 9% | 9% |
| | $1 \cdot 10^{-8}\%$ | 10.3 | 7.5 | 2.77 | 4.98 | 0.64 | 0.77 |
| | | 6% | 4% | 7% | 5% | 12% | 20% |
| | $1 \cdot 10^{-9}\%$ | 10.9 | 7.6 | 3.58 | 5.13 | 0.69 | 0.82 |
| | | 12% | 5.5% | 38% | 8% | 21% | 28% |
| | $1 \cdot 10^{-10}\%$ | 10.8 | 7.6 | 3.24 | 4.96 | 0.65 | 0.80 |
| | | 11% | 5.5% | 25% | 4% | 14% | 25% |
| | $1 \cdot 10^{-11}\%$ | 10.3 | 7.3 | 2.8 | 4.92 | 0.63 | 0.74 |
| | | 6% | 1% | 8% | 3% | 10.5% | 16% |

TABLE XI-continued

Effect of winter wheat seed treatment with Zn-salt solutions of bis-(hydroxymethyl)-phosphinic acid on germinating power

| Variant | Length, cm/+ % to control | | Mass, g/100 plantlings/+ % to control | | | |
|---|---|---|---|---|---|---|
| | | | wet | | dry | |
| | root | sprout | root | sprout | root | sprout |
| $1 \cdot 10^{-12}\%$ | 10.1 | 7.2 | 2.65 | 4.90 | 0.62 | 0.63 |
| | 4% | 0% | 2% | 3% | 9% | −1% |
| $HCP_{05}$ | 0.3 | 0.3 | 0.11 | 0.17 | 0.02 | 0.02 |

TABLE XII

Effect of winter wheat seed treatment with claimed compound solutions and Melaphen on germination energy and germination rate

| Variant | Germination energy, % | Germination rate, % |
|---|---|---|
| Control | 86.0 | 93.3 |
| Melaphen $1 \cdot 10^{-7}\%$ | 95.0 | 98.3 |
| Ca-salt $1 \cdot 10^{-12}\%$ | 87.0 | 93.7 |
| Mg-salt $1 \cdot 10^{-11}\%$ | 93.3 | 96.7 |
| Na-salt $1 \cdot 10^{-9}\%$ | 87.3 | 93.7 |
| Co-salt $1 \cdot 10^{-10}\%$ | 93.7 | 97.3 |
| Mn-salt $1 \cdot 10^{-9}\%$ | 88.0 | 93.7 |
| Cu-salt $1 \cdot 10^{-9}\%$ | 94.7 | 98.7 |
| Zn-salt $1 \cdot 10^{-9}\%$ | 94.0 | 97.3 |

TABLE XIII

Effect of winter wheat seed treatment with claimed compound solutions and Melaphen on germinating power

| Variant | Length, cm/+ % to control | | Mass, g/100 plantlings/+ % to control | | | |
|---|---|---|---|---|---|---|
| | | | wet | | dry | |
| | root | sprout | root | sprout | root | sprout |
| Control | 8.7 | 6.2 | 3.62 | 3.97 | 0.62 | 0.51 |
| Melaphen $1 \cdot 10^{-7}\%$ | 10.3 | 7.3 | 6.02 | 5.27 | 0.72 | 0.59 |
| | 18% | 18% | 66% | 33% | 16% | 16% |
| Ca-salt $1 \cdot 10^{-12}\%$ | 9.7 | 6.4 | 5.03 | 4.88 | 0.66 | 0.54 |
| | 11% | 3% | 40% | 23% | 6% | 6% |
| Mg-salt $1 \cdot 10^{-11}\%$ | 10.0 | 7.2 | 5.76 | 5.04 | 0.69 | 0.57 |
| | 15% | 16% | 59% | 27% | 11% | 12% |
| Na-salt $1 \cdot 10^{-9}\%$ | 8.7 | 6.4 | 4.19 | 4.73 | 0.64 | 0.53 |
| | 0% | 3% | 16% | 19% | 3% | 4% |
| Co-salt $1 \cdot 10^{-10}\%$ | 10.4 | 7.4 | 5.97 | 5.16 | 0.68 | 0.55 |
| | 20% | 19% | 65% | 30% | 10% | 8% |
| Mn-salt $1 \cdot 10^{-9}\%$ | 9.8 | 6.7 | 5.69 | 4.97 | 0.66 | 0.55 |
| | 13% | 8% | 57% | 25% | 6% | 8% |
| Cu-salt $1 \cdot 10^{-9}\%$ | 10.9 | 7.2 | 5.45 | 5.00 | 0.67 | 0.59 |
| | 25% | 16% | 51% | 26% | 8% | 16% |
| Zn-salt $1 \cdot 10^{-9}\%$ | 9.5 | 6.3 | 5.18 | 4.91 | 0.68 | 0.55 |
| | 9% | 2% | 43% | 24% | 10% | 8% |
| $HCP_{05}$ | 0.3 | 0.2 | 0.19 | 0.17 | 0.02 | 0.02 |

TABLE XIV

Effect of corn seed treatment with biogenic metal salts of bis-(hydroxymethyl)-phosphinic acid on germination energy and germination rate, %

| | Ca | | Mg | | Na | |
|---|---|---|---|---|---|---|
| Concentration % | Germination energy | Germination rate | Germination energy | Germination rate | Germination energy | Germination rate |
| Control | 76.7 | 79.2 | 76.7 | 80.3 | 76.3 | 79.0 |
| $1 \cdot 10^{-6}\%$ | 74.3 | 77.0 | 82.3 | 84.7 | 75.7 | 78.3 |
| $1 \cdot 10^{-7}\%$ | 77.3 | 82.0 | 85.3 | 89.0 | 78.0 | 81.8 |
| $1 \cdot 10^{-8}\%$ | 81.8 | 84.2 | 87.7 | 93.3 | 84.8 | 87.5 |
| $1 \cdot 10^{-9}\%$ | 85.0 | 87.7 | 89.7 | 95.8 | 87.7 | 91.7 |
| $1 \cdot 10^{-10}\%$ | 87.8 | 90.0 | 90.3 | 93.7 | 89.7 | 93.0 |
| $1 \cdot 10^{-11}\%$ | 85.5 | 88.3 | 88.0 | 91.7 | 86.8 | 89.5 |
| $1 \cdot 10^{-12}\%$ | 82.3 | 85.0 | 86.7 | 90.8 | 82.0 | 85.5 |

| | Co | | Mn | |
|---|---|---|---|---|
| Concentration % | Germination energy | Germination rate | Germination energy | Germination rate |
| Control | 75.5 | 78.0 | 76.0 | 79.6 |
| $1 \cdot 10^{-6}\%$ | 80.0 | 82.2 | 81.0 | 83.3 |
| $1 \cdot 10^{-7}\%$ | 84.3 | 86.7 | 82.3 | 85.0 |
| $1 \cdot 10^{-8}\%$ | 82.0 | 84.7 | 84.7 | 87.5 |

TABLE XIV-continued

Effect of corn seed treatment with biogenic metal salts of bis-(hydroxymethyl)-phosphinic acid on germination energy and germination rate, %

| | | | | |
|---|---|---|---|---|
| $1 \cdot 10^{-9}\%$ | 80.7 | 83.0 | 87.7 | 90.0 |
| $1 \cdot 10^{-10}\%$ | 79.2 | 81.7 | 85.0 | 87.5 |
| $1 \cdot 10^{-11}\%$ | 78.0 | 80.8 | 82.7 | 85.3 |
| $1 \cdot 10^{-12}\%$ | 76.8 | 79.2 | 80.3 | 83.0 |

| | Cu | | Zn | |
|---|---|---|---|---|
| Concentration % | Germination energy | Germination rate | Germination energy | Germination rate |
| Control | 75.7 | 78.3 | 76.0 | 79.2 |
| $1 \cdot 10^{-6}\%$ | 80.0 | 82.5 | 77.7 | 80.0 |
| $1 \cdot 10^{-7}\%$ | 82.3 | 85.0 | 84.0 | 86.7 |
| $1 \cdot 10^{-8}\%$ | 91.8 | 94.2 | 88.3 | 90.8 |
| $1 \cdot 10^{-9}\%$ | 90.0 | 92.3 | 84.2 | 86.7 |
| $1 \cdot 10^{-10}\%$ | 85.8 | 88.3 | 82.3 | 85.0 |
| $1 \cdot 10^{-11}\%$ | 82.3 | 85.0 | 80.7 | 83.3 |
| $1 \cdot 10^{-12}\%$ | 78.8 | 81.7 | 79.0 | 81.7 |

TABLE XV

Effect of corn seed treatment with Ca-salt solutions of bis-(hydroxymethyl)-phosphinic acid on germinating power

| Variant | | Length. cm/+ % to control | | Mass, g/100 plantlings/+ % to control | | | |
|---|---|---|---|---|---|---|---|
| | | | | wet | | dry | |
| | | root | sprout | root | sprout | root | sprout |
| Control | | 4.5 | 2.6 | 7.49 | 4.46 | 1.11 | 0.69 |
| Concentration of experimental solution % | $1 \cdot 10^{-6}\%$ | 4.2 | 2.5 | 7.30 | 4.21 | 1.09 | 0.63 |
| | | −7% | −4% | −2.5% | −6% | −2% | −9% |
| | $1 \cdot 10^{-7}\%$ | 4.6 | 2.7 | 7.75 | 4.67 | 1.20 | 0.72 |
| | | 2% | 4% | 3% | 5% | 8% | 4% |
| | $1 \cdot 10^{-8}\%$ | 4.8 | 2.8 | 8.13 | 4.84 | 1.24 | 0.85 |
| | | 7% | 8% | 8.5% | 8.5% | 12% | 23% |
| | $1 \cdot 10^{-9}\%$ | 5.2 | 3.0 | 9.18 | 4.99 | 1.26 | 0.96 |
| | | 15.5% | 15% | 22.5% | 12% | 13.5% | 39% |
| | $1 \cdot 10^{-10}\%$ | 5.4 | 3.2 | 9.82 | 5.61 | 1.34 | 1.23 |
| | | 20% | 23% | 31% | 26% | 21% | 78% |
| | $1 \cdot 10^{-11}\%$ | 5.2 | 2.9 | 9.44 | 5.15 | 1.30 | 1.09 |
| | | 15.5% | 11.5% | 26% | 15% | 17% | 58% |
| | $1 \cdot 10^{-12}\%$ | 4.6 | 2.7 | 8.65 | 4.73 | 1.23 | 0.81 |
| | | 2% | 4% | 15% | 6% | 11% | 17% |
| $HCP_{50}$ | | 0.2 | 0.1 | 0.30 | 0.07 | 0.05 | 0.04 |

TABLE XVI

Effect of corn seed treatment with Mg-salt solutions of bis-(hydroxymethyl)-phosphinic acid on germinating power

| Variant | | Length. cm/+ % to control | | Mass, g/100 plantlings/+ % to control | | | |
|---|---|---|---|---|---|---|---|
| | | | | wet | | dry | |
| | | root | sprout | root | sprout | root | sprout |
| Control | | 5.3 | 3.3 | 8.77 | 6.42 | 1.46 | 0.96 |
| Concentration of experimental solution % | $1 \cdot 10^{-6}\%$ | 6.4 | 2.9 | 10.29 | 7.17 | 1.60 | 1.07 |
| | | 21% | −12% | 17% | 12% | 9.5% | 11% |
| | $1 \cdot 10^{-7}\%$ | 7.0 | 3.3 | 10.86 | 7.93 | 1.81 | 1.12 |
| | | 32% | 0% | 24% | 23.5% | 24% | 17% |
| | $1 \cdot 10^{-8}\%$ | 8.5 | 3.5 | 11.64 | 8.89 | 1.91 | 1.19 |
| | | 60% | 6% | 33% | 38% | 31% | 24% |
| | $1 \cdot 10^{-9}\%$ | 9.1 | 3.8 | 12.42 | 10.35 | 2.02 | 1.27 |
| | | 72% | 15% | 42% | 61% | 38% | 32% |

TABLE XVI-continued

Effect of corn seed treatment with Mg-salt solutions of bis-(hydroxymethyl)-phosphinic acid on germinating power

| Variant | Length. cm/+ % to control | | Mass, g/100 plantlings/+ % to control | | | |
|---|---|---|---|---|---|---|
| | | | wet | | dry | |
| | root | sprout | root | sprout | root | sprout |
| $1 \cdot 10^{-10}\%$ | 8.3 | 3.6 | 11.86 | 8.62 | 1.96 | 1.20 |
| | 57% | 9% | 35% | 34% | 34% | 25% |
| $1 \cdot 10^{-11}\%$ | 8.1 | 3.0 | 10.04 | 8.18 | 1.81 | 1.10 |
| | 53% | −9% | 14% | 27% | 24% | 14.5% |
| $1 \cdot 10^{-12}\%$ | 7.8 | 2.8 | 9.18 | 7.04 | 1.57 | 0.94 |
| | 47% | −15% | 5% | 10% | 7.5% | −2% |
| $HCP_{05}$ | 0.3 | 0.1 | 0.38 | 0.30 | 0.06 | 0.04 |

TABLE XVII

Effect of corn seed treatment with Na-salt solutions of bis-(hydroxymethyl)-phosphinic acid on germinating power

| Variant | | Length. cm/ + % to control | | Mass, g/100 plantlings/+ % to control | | | |
|---|---|---|---|---|---|---|---|
| | | | | wet | | dry | |
| | | root | sprout | root | sprout | root | sprout |
| Control | | 4.7 | 2.8 | 6.79 | 4.57 | 1.22 | 0.72 |
| Concentration of experimental solution % | $1 \cdot 10^{-6}\%$ | 4.5 | 2.4 | 5.95 | 4.34 | 0.99 | 0.69 |
| | | −4% | −14% | −12% | −5% | −19% | −4% |
| | $1 \cdot 10^{-7}\%$ | 4.9 | 2.6 | 6.72 | 4.62 | 1.03 | 0.77 |
| | | 4% | −7% | −1% | 1% | −15.5% | 7% |
| | $1 \cdot 10^{-8}\%$ | 5.0 | 2.8 | 6.93 | 4.74 | 1.18 | 0.86 |
| | | 6% | 0% | 2% | 4% | −3% | 19% |
| | $1 \cdot 10^{-9}\%$ | 5.2 | 3.0 | 7.08 | 4.91 | 1.25 | 0.69 |
| | | 11% | 7% | 4% | 7% | 2% | 26% |
| | $1 \cdot 10^{-10}\%$ | 5.5 | 3.1 | 7.19 | 5.35 | 1.30 | 1.12 |
| | | 17% | 11% | 6% | 17% | 6.5% | 55.5% |
| | $1 \cdot 1^{-11}\%$ | 5.3 | 2.9 | 6.88 | 4.99 | 1.26 | 0.92 |
| | | 13% | 3.5% | 1% | 9% | 3% | 28% |
| | $1 \cdot 10^{-12}\%$ | 4.6 | 2.6 | 6.12 | 4.37 | 0.95 | 0.80 |
| | | −2% | −7% | −10% | −4% | −22% | 11% |
| $HCP_{05}$ | | 0.2 | 0.1 | 0.24 | 0.18 | 0.04 | 0.03 |

TABLE XVIII

Effect of corn seed treatment with Co-salt solutions of bis-(hydroxymethyl)-phosphinic acid on germinating power

| Variant | | Length. cm/ + % to control | | Mass, g/100 plantlings/+ % to control | | | |
|---|---|---|---|---|---|---|---|
| | | | | wet | | dry | |
| | | root | sprout | root | sprout | root | sprout |
| Control | | 4.7 | 3.0 | 8.97 | 6.22 | 1.25 | 0.97 |
| Concentration of experimental solution % | $1 \cdot 10^{-6}\%$ | 5.0 | 3.2 | 9.76 | 7.75 | 1.31 | 1.09 |
| | | 6% | 7% | 9% | 24.5% | 5% | 12% |
| | $1 \cdot 10^{-7}\%$ | 6.2 | 3.8 | 10.77 | 9.96 | 1.44 | 1.21 |
| | | 32% | 27% | 20% | 60% | 15% | 25% |
| | $1 \cdot 10^{-8}\%$ | 5.6 | 3.6 | 10.17 | 9.00 | 1.37 | 1.14 |
| | | 19% | 20% | 13% | 45% | 10% | 17.5% |
| | $1 \cdot 10^{-9}\%$ | 5.0 | 3.5 | 10.00 | 7.58 | 1.31 | 1.07 |
| | | 6% | 17% | 11% | 22% | 5% | 10% |
| | $1 \cdot 10^{-10}\%$ | 4.9 | 3.3 | 9.80 | 6.75 | 1.29 | 1.03 |
| | | 4% | 10% | 9% | 8.5% | 3% | 6% |
| | $1 \cdot 10^{-11}\%$ | 4.5 | 3.0 | 9.62 | 6.41 | 1.27 | 0.98 |
| | | −4% | 0% | 7% | 3% | 2% | 1% |

TABLE XVIII-continued

Effect of corn seed treatment with Co-salt solutions of bis-(hydroxymethyl)-phosphinic acid on germinating power

| | Length. cm/ + % to control | | Mass, g/100 plantlings/+ % to control | | | |
|---|---|---|---|---|---|---|
| | | | wet | | dry | |
| Variant | root | sprout | root | sprout | root | sprout |
| $1 \cdot 10^{-12}\%$ | 4.2 | 2.9 | 9.28 | 6.23 | 1.22 | 0.98 |
| | −11% | −3% | 3% | 0% | −2% | 1% |
| $HCP_{05}$ | 0.2 | 0.1 | 0.36 | 0.29 | 0.05 | 0.04 |

TABLE XIX

Effect of corn seed treatment with Mn-salt solutions of bis-(hydroxymethyl)-phosphinic acid on germinating power

| | | Length. cm/ + % to control | | Mass, g/100 plantlings/+ % to control | | | |
|---|---|---|---|---|---|---|---|
| | | | | wet | | dry | |
| Variant | | root | sprout | root | sprout | root | sprout |
| Control | | 4.8 | 3.4 | 8.83 | 5.90 | 1.39 | 0.79 |
| Concentration of experimental solution % | $1 \cdot 10^{-6}\%$ | 4.6 | 2.8 | 9.87 | 5.92 | 1.47 | 0.83 |
| | | −4% | −18% | 12% | 0% | 6% | 5% |
| | $1 \cdot 10^{-7}\%$ | 5.0 | 3.1 | 10.61 | 6.63 | 1.55 | 0.89 |
| | | 4% | −9% | 20% | 12% | 11.5% | 13% |
| | $1 \cdot 10^{-8}\%$ | 5.4 | 3.6 | 11.92 | 7.03 | 1.69 | 1.05 |
| | | 12.5% | 6% | 35% | 19% | 21.5% | 33% |
| | $1 \cdot 10^{-9}\%$ | 5.8 | 3.9 | 12.62 | 7.69 | 1.82 | 1.25 |
| | | 21% | 15% | 43% | 30% | 31% | 58% |
| | $1 \cdot 10^{-10}\%$ | 5.5 | 3.7 | 12.06 | 7.29 | 1.72 | 1.17 |
| | | 14.5% | 9% | 36.5% | 23.5% | 24% | 48% |
| | $1 \cdot 10^{-11}\%$ | 5.3 | 3.4 | 11.78 | 6.91 | 1.61 | 0.92 |
| | | 10% | 0% | 33% | 17% | 16% | 16% |
| | $1 \cdot 10^{-12}\%$ | 4.9 | 2.9 | 10.88 | 6.28 | 1.47 | 0.79 |
| | | 2% | −15% | 23% | 6% | 6% | 0% |
| $HCP_{05}$ | | 0.2 | 0.1 | 0.39 | 0.27 | 0.07 | 0.04 |

TABLE XX

Effect of corn seed treatment with Cu-salt solutions of bis-(hydroxymethyl)-phosphinic acid on germinating power

| | | Length. cm/+ % to control | | Mass, g/100 plantlings/+ % to control | | | |
|---|---|---|---|---|---|---|---|
| | | | | wet | | dry | |
| Variant | | root | sprout | root | sprout | root | sprout |
| Control | | 4.8 | 3.5 | 8.12 | 6.25 | 1.19 | 0.99 |
| Concentration of experimental solution % | $1 \cdot 10^{-6}\%$ | 5.2 | 4.2 | 8.99 | 7.21 | 1.27 | 1.01 |
| | | 8% | 20% | 11% | 15% | 7% | 2% |
| | $1 \cdot 10^{-7}\%$ | 5.4 | 4.6 | 9.81 | 7.94 | 1.38 | 1.09 |
| | | 12.5% | 31% | 21% | 27% | 16% | 10% |
| | $1 \cdot 10^{-8}\%$ | 5.6 | 4.8 | 10.67 | 8.82 | 1.53 | 1.17 |
| | | 16% | 37% | 31% | 41% | 28.5% | 18% |
| | $1 \cdot 10^{-9}\%$ | 5.3 | 4.7 | 9.58 | 8.75 | 1.50 | 1.13 |
| | | 10% | 34% | 18% | 40% | 26% | 14% |
| | $1 \cdot 10^{-10}\%$ | 5.1 | 4.4 | 9.13 | 7.88 | 1.35 | 1.07 |
| | | 6% | 26% | 12% | 26% | 13% | 8% |
| | $1 \cdot 10^{-11}\%$ | 5.0 | 3.9 | 8.61 | 6.79 | 1.25 | 0.97 |
| | | 4% | 11% | 6% | 9% | 5% | −2% |
| | $1 \cdot 10^{-12}\%$ | 4.8 | 3.7 | 8.37 | 6.35 | 1.21 | 0.92 |
| | | 0% | 6% | 3% | 2% | 2% | −7% |
| $HCP_{05}$ | | 0.2 | 0.2 | 0.34 | 0.27 | 0.05 | 0.04 |

TABLE XXI

Effect of corn seed treatment with Zn-salt solutions of bis-(hydroxymethyl)-phosphinic acid on germinating power

| Variant | | Length. cm/+ % to control | | Mass, g/100 plantlings/+ % to control | | | |
|---|---|---|---|---|---|---|---|
| | | | | wet | | dry | |
| | | root | sprout | root | sprout | root | sprout |
| Control | | 4.7 | 3.3 | 6.43 | 5.68 | 1.04 | 0.86 |
| Concentration of experimental solution % | $1 \cdot 10^{-6}$% | 5.3 | 3.4 | 6.98 | 5.99 | 1.17 | 0.97 |
| | | 13% | 3% | 8.5% | 5% | 12.5% | 13% |
| | $1 \cdot 10^{-7}$% | 5.6 | 3.5 | 7.46 | 7.03 | 1.30 | 1.10 |
| | | 19% | 6% | 16% | 24% | 25% | 28% |
| | $1 \cdot 10^{-8}$% | 5.9 | 4.0 | 8.18 | 7.82 | 1.36 | 1.13 |
| | | 25.5% | 21% | 27% | 38% | 31% | 31% |
| | $1 \cdot 10^{-9}$% | 5.8 | 3.8 | 7.39 | 6.99 | 1.19 | 1.06 |
| | | 23% | 15% | 15% | 23% | 14% | 23% |
| | $1 \cdot 10^{-10}$% | 5.5 | 3.7 | 6.96 | 6.29 | 1.13 | 1.00 |
| | | 15% | 12% | 8% | 11% | 9% | 16% |
| | $1 \cdot 10^{-11}$% | 5.2 | 3.6 | 6.81 | 5.93 | 1.10 | 0.97 |
| | | 11% | 9% | 6% | 4% | 6% | 13% |
| | $1 \cdot 10^{-12}$% | 4.8 | 3.5 | 6.47 | 5.71 | 0.93 | 0.89 |
| | | 2% | 6% | 1% | 0.5% | −10.5% | 3% |
| $HCP_{05}$ | | 0.2 | 0.1 | 0.27 | 0.25 | 0.05 | 0.04 |

TABLE XXII

Effect of corn seed treatment with claimed compound solutions and Melaphen on germination energy and germination rate

| Variant | Germination energy, % | Germination rate, % |
|---|---|---|
| Control | 82.3 | 92.3 |
| Melaphen $1 \cdot 10^{-7}$% | 90.7 | 97.7 |
| Ca-salt $1 \cdot 10^{-10}$% | 85.0 | 95.3 |
| Mg-salt $1 \cdot 10^{-9}$% | 86.0 | 95.7 |
| Na-salt $1 \cdot 10^{-10}$% | 85.7 | 94.0 |
| Co-salt $1 \cdot 10^{-7}$% | 87.0 | 96.7 |
| Mn-salt $1 \cdot 10^{-9}$% | 87.3 | 95.0 |
| Cu-salt $1 \cdot 10^{-8}$% | 87.7 | 97.0 |
| Zn-salt $1 \cdot 10^{-8}$% | 88.0 | 95.7 |

TABLE XXIII

Effect of corn seed treatment with claimed compound solutions and Melaphen on germinating power

| Variant | Length. cm/+ % to control | | Mass, g/100 plantlings/+ % to control | | | |
|---|---|---|---|---|---|---|
| | | | wet | | dry | |
| | root | sprout | root | sprout | root | sprout |
| Control | 5.9 | 2.7 | 8.75 | 7.12 | 1.76 | 1.36 |
| Melaphen $1 \cdot 10^{-7}$% | 8.4 | 4.3 | 12.02 | 10.23 | 2.42 | 1.86 |
| | 42% | 59% | 37% | 44% | 37.5% | 37% |
| Ca-salt $1 \cdot 10^{-10}$% | 6.6 | 3.2 | 9.63 | 8.59 | 2.03 | 1.47 |
| | 12% | 18.5% | 10% | 21% | 15% | 8% |
| Mg-salt $1 \cdot 10^{-9}$% | 8.0 | 3.7 | 11.64 | 9.81 | 2.28 | 1.68 |
| | 35.5% | 37% | 33% | 38% | 29.5% | 23.5% |
| Na-salt $1 \cdot 10^{-10}$% | 7.0 | 3.1 | 8.29 | 8.15 | 1.86 | 1.42 |
| | 19% | 15% | −5% | 14% | 6% | 4% |
| Co-salt $1 \cdot 10^{-7}$% | 7.8 | 3.5 | 11.92 | 10.04 | 2.35 | 1.77 |
| | 32% | 30% | 36% | 41% | 33.5% | 30% |
| Mn-salt $1 \cdot 10^{-9}$% | 7.4 | 3.4 | 11.24 | 8.64 | 2.11 | 1.51 |
| | 25% | 26% | 28% | 21% | 20% | 11% |
| Cu-salt $1 \cdot 10^{-8}$% | 8.0 | 3.7 | 11.73 | 9.92 | 2.30 | 1.65 |
| | 35.5% | 37% | 34% | 39% | 31% | 21% |
| Zn-salt $1 \cdot 10^{-8}$% | 8.3 | 3.9 | 9.17 | 8.33 | 1.97 | 1.44 |
| | 41% | 44% | 5% | 17% | 12% | 6% |
| $HCP_{05}$ | 0.3 | 0.1 | 0.38 | 0.32 | 0.08 | 0.05 |

TABLE XXIV

Effect of corn seed treatment with biogenic metal salts of bis-(hydroxymethyl)-phosphinic acid on germination energy and germination rate, %

| | Ca | | Mg | | Na | |
|---|---|---|---|---|---|---|
| Concentration % | Germination energy | Germination rate | Germination energy | Germination rate | Germination energy | Germination rate |
| Control | 77.3 | 81.3 | 78.0 | 82.7 | 76.3 | 81.7 |
| $1 \cdot 10^{-6}$% | 75.9 | 81.0 | 77.7 | 83.3 | 74.7 | 80.3 |
| $1 \cdot 10^{-7}$% | 76.0 | 83.3 | 80.3 | 85.0 | 76.7 | 82.8 |
| $1 \cdot 10^{-8}$% | 79.3 | 85.0 | 81.7 | 87.3 | 78.3 | 84.0 |

TABLE XXIV-continued

Effect of corn seed treatment with biogenic metal salts of bis-(hydroxymethyl)-phosphinic acid on germination energy and germination rate, %

| | | | | | | |
|---|---|---|---|---|---|---|
| $1 \cdot 10^{-9}$% | 82.0 | 87.0 | 84.3 | 90.7 | 80.0 | 86.3 |
| $1 \cdot 10^{-10}$% | 85.0 | 92.0 | 86.3 | 92.7 | 82.3 | 88.0 |
| $1 \cdot 10^{-11}$% | 83.3 | 89.3 | 83.3 | 89.3 | 84.0 | 90.3 |
| $1 \cdot 10^{-12}$% | 78.3 | 84.3 | 79.3 | 84.7 | 79.0 | 85.3 |

| | Co | | Mn | |
|---|---|---|---|---|
| Concentration % | Germination energy | Germination rate | Germination energy | Germination rate |
| Control | 78.3 | 83.3 | 77.7 | 83.0 |
| $1 \cdot 10^{-6}$% | 80.7 | 84.0 | 77.0 | 82.7 |
| $1 \cdot 10^{-7}$% | 83.0 | 87.0 | 79.3 | 85.0 |
| $1 \cdot 10^{-8}$% | 84.0 | 90.3 | 82.7 | 86.7 |
| $1 \cdot 10^{-9}$% | 86.3 | 93.7 | 85.3 | 91.7 |
| $1 \cdot 10^{-10}$% | 85.7 | 91.3 | 83.3 | 88.3 |
| $1 \cdot 10^{-11}$% | 84.0 | 88.0 | 81.0 | 86.0 |
| $1 \cdot 10^{-12}$% | 81.3 | 85.3 | 78.0 | 83.0 |

TABLE XIV (continued)

| | Cu | | Zn | |
|---|---|---|---|---|
| Concentration % | Germination energy | Germination rate | Germination energy | Germination rate |
| Control | 79.7 | 86.3 | 81.0 | 87.7 |
| $1 \cdot 10^{-6}$% | 81.7 | 88.3 | 83.0 | 89.0 |
| $1 \cdot 10^{-7}$% | 84.3 | 90.0 | 85.0 | 91.7 |
| $1 \cdot 10^{-8}$% | 85.7 | 92.0 | 86.3 | 94.3 |
| $1 \cdot 10^{-9}$% | 87.7 | 94.0 | 88.7 | 96.0 |
| $1 \cdot 10^{-10}$% | 88.7 | 96.7 | 87.0 | 94.0 |
| $1 \cdot 10^{-11}$% | 85.7 | 94.3 | 85.7 | 91.3 |
| $1 \cdot 10^{-12}$% | 82.0 | 87.7 | 83.7 | 89.0 |

TABLE XXV

Effect of rice seed treatment with Ca-salt solutions of bis-(hydroxymethyl)-phosphinic acid on germinating power

| | | Length, cm/ + % to control | | Mass, g/100 plantlings/+ % to control | | | |
|---|---|---|---|---|---|---|---|
| | | | | wet | | dry | |
| Variant | | root | sprout | root | sprout | root | sprout |
| Control | | 5.2 | 2.5 | 0.96 | 1.76 | 0.17 | 0.21 |
| Concentration of experimental solution % | $1 \cdot 10^{-6}$% | 5.7 | 2.8 | 1.10 | 1.92 | 0.19 | 0.23 |
| | | 10% | 12% | 14.5% | 9% | 12% | 9.5% |
| | $1 \cdot 10^{-7}$% | 5.9 | 3.0 | 1.21 | 2.16 | 0.24 | 0.26 |
| | | 13% | 20% | 26% | 23% | 41% | 24% |
| | $1 \cdot 10^{-8}$% | 6.3 | 3.1 | 1.24 | 2.25 | 0.27 | 0.28 |
| | | 21% | 24% | 29% | 28% | 59% | 33% |
| | $1 \cdot 10^{-9}$% | 6.6 | 3.2 | 1.29 | 2.36 | 0.30 | 0.32 |
| | | 27% | 28% | 34% | 34% | 76% | 52% |
| | $1 \cdot 10^{-10}$% | 6.4 | 3.0 | 1.27 | 2.28 | 0.28 | 0.29 |
| | | 23% | 20% | 32% | 29.5% | 65% | 38% |
| | $1 \cdot 10^{-11}$% | 6.0 | 2.9 | 1.22 | 1.98 | 0.23 | 0.27 |
| | | 15% | 16% | 27% | 12.5% | 35% | 28.5% |
| | $1 \cdot 10^{-12}$% | 5.6 | 2.7 | 1.06 | 1.88 | 0.19 | 0.26 |
| | | 8% | 8% | 10% | 7% | 12% | 24% |
| $HCP_{05}$ | | 0.2 | 0.1 | 0.04 | 0.07 | 0.03 | 0.01 |

TABLE XXVI

Effect of rice seed treatment with Mg-salt solutions of bis-(hydroxymethyl)-phosphinic acid on germinating power

| | | Length. cm/ + % to control | | Mass, g/100 plantlings/+ % to control | | | |
|---|---|---|---|---|---|---|---|
| | | | | wet | | dry | |
| Variant | | root | sprout | root | sprout | root | sprout |
| Control | | 5.3 | 2.7 | 0.99 | 1.78 | 0.22 | 0.29 |
| Concentration of experimental solution % | $1 \cdot 10^{-6}\%$ | 6.0 | 2.8 | 1.17 | 1.96 | 0.23 | 0.35 |
| | | 13% | 4% | 18% | 10% | 4.5% | 21% |
| | $1 \cdot 10^{-7}\%$ | 6.4 | 2.9 | 1.26 | 2.21 | 0.25 | 0.40 |
| | | 21% | 7% | 27% | 24% | 14% | 40% |
| | $1 \cdot 10^{-8}\%$ | 6.6 | 3.0 | 1.35 | 2.31 | 0.26 | 0.43 |
| | | 24.5% | 11% | 36% | 30% | 18% | 48% |
| | $1 \cdot 10^{-9}\%$ | 7.0 | 3.2 | 1.46 | 2.37 | 0.29 | 0.47 |
| | | 32% | 18.5% | 46% | 33% | 32% | 62% |
| | $1 \cdot 10^{-10}\%$ | 7.2 | 3.8 | 1.62 | 2.52 | 0.35 | 0.49 |
| | | 36% | 41% | 63% | 41.5% | 59% | 69% |
| | $1 \cdot 10^{-11}\%$ | 6.7 | 3.1 | 1.44 | 2.34 | 0.27 | 0.44 |
| | | 26% | 15% | 45% | 31% | 23% | 52% |
| | $1 \cdot 10^{-12}\%$ | 6.3 | 2.9 | 1.31 | 2.18 | 0.23 | 0.39 |
| | | 19% | 7% | 32% | 22% | 4.5% | 34% |
| $HCP_{05}$ | | 0.2 | 0.1 | 0.05 | 0.08 | 0.01 | 0.01 |

TABLE XXVII

Effect of rice seed treatment with Na-salt solutions of bis-(hydroxymethyl)-phosphinic acid on germinating power

| | | Length. cm/ + % to control | | Mass, g/100 plantlings/+ % to control | | | |
|---|---|---|---|---|---|---|---|
| | | | | wet | | dry | |
| Variant | | root | sprout | root | sprout | root | sprout |
| Control | | 5.2 | 2.1 | 0.91 | 1.64 | 0.20 | 0.26 |
| Concentration of experimental solution % | $1 \cdot 10^{-6}\%$ | 5.4 | 2.3 | 1.06 | 1.73 | 0.21 | 0.28 |
| | | 4% | 9.5% | 16.5% | 5.5% | 5% | 8% |
| | $1 \cdot 10^{-7}\%$ | 5.6 | 2.4 | 1.10 | 1.81 | 0.22 | 0.30 |
| | | 8% | 14% | 21% | 10% | 10% | 15% |
| | $1 \cdot 10^{-8}\%$ | 5.8 | 2.6 | 1.14 | 1.89 | 0.23 | 0.31 |
| | | 11.5% | 24% | 25% | 15% | 15% | 19% |
| | $1 \cdot 10^{-9}\%$ | 6.0 | 2.8 | 1.17 | 2.00 | 0.25 | 0.33 |
| | | 15% | 33% | 28.5% | 22% | 25% | 27% |
| | $1 \cdot 10^{-10}\%$ | 6.3 | 3.5 | 1.26 | 2.18 | 0.27 | 0.35 |
| | | 21% | 58% | 38% | 33% | 35% | 35% |
| | $1 \cdot 10^{-11}\%$ | 6.4 | 4.0 | 1.35 | 2.30 | 0.30 | 0.39 |
| | | 23% | 90% | 48% | 40% | 50% | 50% |
| | $1 \cdot 10^{-12}\%$ | 6.2 | 3.6 | 1.18 | 2.23 | 0.26 | 0.33 |
| | | 19% | 71% | 30% | 36% | 30% | 27% |
| $HCP_{05}$ | | 0.2 | 0.1 | 0.04 | 0.07 | 0.01 | 0.01 |

TABLE XXVIII

Effect of rice seed treatment with Co-salt solutions of bis-(hydroxymethyl)-phosphinic acid on germinating power

| | | Length. cm/ + % to control | | Mass, g/100 plantlings/+ % to control | | | |
|---|---|---|---|---|---|---|---|
| | | | | wet | | dry | |
| Variant | | root | sprout | root | sprout | root | sprout |
| Control | | 4.7 | 2.3 | 0.82 | 1.48 | 0.17 | 0.20 |
| Concentration of experimental solution % | $1 \cdot 10^{6}\%$ | 5.1 | 2.6 | 0.89 | 1.71 | 0.19 | 0.25 |
| | | 8.5% | 13% | 8.5% | 15.5% | 12% | 25% |
| | $1 \cdot 10^{-7}\%$ | 5.4 | 2.9 | 0.94 | 1.80 | 0.22 | 0.28 |
| | | 15% | 26% | 15% | 22% | 29% | 40% |
| | $1 \cdot 10^{-8}\%$ | 5.7 | 3.1 | 1.07 | 2.01 | 0.24 | 0.31 |
| | | 21% | 35% | 30% | 36% | 41% | 55% |

TABLE XXVIII-continued

Effect of rice seed treatment with Co-salt solutions of bis-(hydroxymethyl)-phosphinic acid on germinating power

| Variant | Length. cm/ + % to control | | Mass, g/100 plantlings/+ % to control | | | |
|---|---|---|---|---|---|---|
| | | | wet | | dry | |
| | root | sprout | root | sprout | root | sprout |
| $1 \cdot 10^{-9}\%$ | 6.2 | 3.5 | 1.15 | 2.09 | 0.26 | 0.35 |
| | 32% | 52% | 40% | 41% | 53% | 75% |
| $1 \cdot 10^{-10}\%$ | 5.8 | 3.2 | 1.03 | 1.97 | 0.23 | 0.28 |
| | 23% | 39% | 26% | 33% | 35% | 40% |
| $1 \cdot 10^{-11}\%$ | 5.6 | 2.8 | 0.94 | 1.89 | 0.20 | 0.26 |
| | 19% | 22% | 15% | 28% | 18% | 30% |
| $1 \cdot 10^{-12}\%$ | 5.2 | 2.7 | 0.88 | 1.82 | 0.19 | 0.24 |
| | 11% | 17% | 7% | 23% | 12% | 20% |
| $HCP_{05}$ | 0.2 | 0.1 | 0.04 | 0.07 | 0.01 | 0.01 |

TABLE XXIX

Effect of rice seed treatment with Mn-salt solutions of bis-(hydroxymethyl)-phosphinic acid on germinating power

| Variant | | Length. cm/ + % to control | | Mass, g/100 plantlings/+ % to control | | | |
|---|---|---|---|---|---|---|---|
| | | | | wet | | dry | |
| | | root | sprout | root | sprout | root | sprout |
| Control | | 6.0 | 2.5 | 0.98 | 1.72 | 0.20 | 0.26 |
| Concentration | $1 \cdot 10^{-6}\%$ | 6.2 | 2.7 | 1.13 | 1.80 | 0.22 | 0.29 |
| of | | 3% | 8% | 15% | 5% | 10% | 11.5% |
| experimental | $1 \cdot 10^{-7}\%$ | 6.4 | 2.9 | 1.21 | 2.12 | 0.25 | 0.36 |
| solution % | | 7% | 16% | 23% | 23% | 25% | 38% |
| | $1 \cdot 10^{-8}\%$ | 6.5 | 3.1 | 1.30 | 2.26 | 0.28 | 0.41 |
| | | 8% | 24% | 33% | 31% | 40% | 58% |
| | $1 \cdot 10^{-9}\%$ | 6.8 | 3.3 | 1.44 | 2.41 | 0.32 | 0.44 |
| | | 13% | 32% | 47% | 40% | 60% | 69% |
| | $1 \cdot 10^{-10}\%$ | 6.7 | 3.0 | 1.33 | 2.30 | 0.26 | 0.39 |
| | | 12% | 12% | 36% | 34% | 30% | 50% |
| | $1 \cdot 10^{-11}\%$ | 6.5 | 2.9 | 1.29 | 2.21 | 0.23 | 0.36 |
| | | 8% | 16% | 31% | 28% | 15% | 38% |
| | $1 \cdot 10^{-12}\%$ | 6.3 | 2.7 | 1.27 | 2.14 | 0.20 | 0.32 |
| | | 5% | 8% | 29% | 24% | 0% | 23% |
| $HCP_{05}$ | | 0.2 | 0.1 | 0.04 | 0.07 | 0.01 | 0.01 |

TABLE XXX

Effect of rice seed treatment with Cu-salt solutions of bis-(hydroxymethyl)-phosphinic acid on germinating power

| Variant | | Length. cm/ + % to control | | Mass, g/100 plantlings/+ % to control | | | |
|---|---|---|---|---|---|---|---|
| | | | | wet | | dry | |
| | | root | sprout | root | sprout | root | sprout |
| Control | | 5.1 | 2.4 | 0.82 | 1.38 | 0.17 | 0.23 |
| Concentration | $1 \cdot 10^{-6}\%$ | 5.4 | 2.6 | 0.93 | 1.47 | 0.19 | 0.26 |
| of | | 6% | 8% | 13% | 6.5% | 12% | 13% |
| experimental | $1 \cdot 10^{-7}\%$ | 5.5 | 2.7 | 1.03 | 1.61 | 0.21 | 0.29 |
| solution % | | 8% | 12.5% | 26% | 17% | 23.5% | 26% |
| | $1 \cdot 10^{-8}\%$ | 5.7 | 2.8 | 1.09 | 1.74 | 0.23 | 0.31 |
| | | 12% | 17% | 33% | 26% | 35% | 35% |
| | $1 \cdot 10^{-9}\%$ | 5.9 | 2.8 | 1.16 | 1.92 | 0.25 | 0.33 |
| | | 16% | 17% | 41% | 39% | 47% | 43% |

TABLE XXX-continued

Effect of rice seed treatment with Cu-salt solutions of bis-(hydroxymethyl)-phosphinic acid on germinating power

| Variant | Length. cm/ + % to control | | Mass, g/100 plantlings/+ % to control | | | |
|---|---|---|---|---|---|---|
| | | | wet | | dry | |
| | root | sprout | root | sprout | root | sprout |
| $1 \cdot 10^{-10}\%$ | 6.0 | 2.9 | 1.22 | 2.11 | 0.27 | 0.36 |
| | 18% | 21% | 49% | 53% | 59% | 56.5% |
| $1 \cdot 10^{-11}\%$ | 5.9 | 2.7 | 1.12 | 1.87 | 0.24 | 0.32 |
| | 16% | 12.5% | 36.5% | 35.5% | 41% | 39% |
| $1 \cdot 10^{-12}\%$ | 5.6 | 2.6 | 1.01 | 1.75 | 0.20 | 0.27 |
| | 10% | 8% | 23% | 27% | 18% | 17% |
| $HCP_{05}$ | 0.2 | 0.1 | 0.04 | 006 | 0.01 | 0.01 |

TABLE XXXI

Effect of rice seed treatment with Zn-salt solutions of bis-(hydroxymethyl)-phosphinic acid on germinating power

| Variant | | Length. cm/ + % to control | | Mass, g/100 plantlings/+ % to control | | | |
|---|---|---|---|---|---|---|---|
| | | | | wet | | dry | |
| | | root | sprout | root | sprout | root | sprout |
| Control | | 5.4 | 2.4 | 0.84 | 1.46 | 0.17 | 0.22 |
| Concentration | $1 \cdot 10^{-6}\%$ | 6.2 | 2.6 | 1.04 | 1.81 | 0.19 | 0.23 |
| of | | 15% | 8% | 24% | 24% | 12% | 4.5% |
| experimental | $1 \cdot 10^{-7}\%$ | 6.6 | 2.8 | 1.21 | 2.10 | 0.22 | 0.27 |
| solution % | | 22% | 17% | 44% | 44% | 29% | 23% |
| | $1 \cdot 10^{-8}\%$ | 6.8 | 3.1 | 1.29 | 2.27 | 0.24 | 0.28 |
| | | 26% | 29% | 53.5% | 55% | 41% | 27% |
| | $1 \cdot 10^{-9}\%$ | 7.0 | 3.6 | 1.32 | 2.31 | 0.27 | 0.33 |
| | | 30% | 50% | 57% | 58% | 59% | 50% |
| | $1 \cdot 10^{-10}\%$ | 6.9 | 3.2 | 1.26 | 2.17 | 0.25 | 0.31 |
| | | 28% | 33% | 50% | 49% | 47% | 41% |
| | $1 \cdot 10^{-11}\%$ | 6.7 | 2.8 | 1.19 | 2.09 | 0.22 | 0.29 |
| | | 24% | 17% | 42% | 43% | 29% | 32% |
| | $1 \cdot 10^{-12}\%$ | 5.9 | 2.7 | 1.05 | 1.70 | 0.19 | 0.25 |
| | | 9% | 12.5% | 25% | 16% | 12% | 14% |
| $HCP_{05}$ | | 0.2 | 0.1 | 0.04 | 0.07 | 0.01 | 0.01 |

TABLE XXXII

Effect of rice seed treatment with claimed compound solutions and Melaphen on germination energy and germination rate

| Variant | Germination energy, % | Germination rate, % |
|---|---|---|
| Control | 78.0 | 85.3 |
| Melaphen $1 \cdot 10^{-8}\%$ | 89.5 | 96.3 |
| Ca-salt $1 \cdot 10^{-9}\%$ | 86.3 | 93.3 |
| Mg-salt $1 \cdot 10^{-10}\%$ | 87.5 | 94.0 |
| Na-salt $1 \cdot 10^{-11}\%$ | 85.0 | 92.0 |
| Co-salt $1 \cdot 10^{-9}\%$ | 87.5 | 94.5 |
| Mn-salt $1 \cdot 10^{-9}\%$ | 86.7 | 93.0 |
| Cu-salt $1 \cdot 10^{-10}\%$ | 88.0 | 96.0 |
| Zn-salt $1 \cdot 10^{-10}\%$ | 89.5 | 96.5 |

TABLE XXXIII

Effect of rice seed treatment with claimed compound solutions and Melaphen on germinating power

| Variant | Length. cm/ + % to control | | Mass, g/100 plantlings/+ % to control | | | |
|---|---|---|---|---|---|---|
| | | | wet | | dry | |
| | root | sprout | root | sprout | root | sprout |
| Control | 4.8 | 2.6 | 0.98 | 1.51 | 0.21 | 0.25 |
| Melaphen $1 \cdot 10^{-8}\%$ | 7.6 | 4.9 | 1.57 | 2.62 | 0.29 | 0.35 |
| | 58% | 88% | 60% | 73.5% | 38% | 40% |
| Ca-salt $1 \cdot 10^{-9}\%$ | 6.2 | 3.5 | 1.33 | 2.24 | 0.23 | 0.27 |
| | 29% | 35% | 36% | 48% | 9.5% | 8% |
| Mg-salt $1 \cdot 10^{-10}\%$ | 7.2 | 4.6 | 1.39 | 2.39 | 0.26 | 0.30 |
| | 50% | 77% | 42% | 58% | 24% | 20% |
| Na-salt $1 \cdot 10^{-11}\%$ | 5.9 | 3.4 | 1.31 | 2.22 | 0.22 | 0.26 |
| | 23% | 46% | 34% | 47% | 5% | 24% |
| Co-salt $1 \cdot 10^{-9}\%$ | 6.4 | 3.7 | 1.37 | 2.28 | 0.25 | 0.28 |
| | 33% | 42% | 40% | 51% | 19% | 12% |

TABLE XXXIII-continued

Effect of rice seed treatment with claimed compound solutions and Melaphen on germinating power

| Variant | Length. cm/+ % to control | | Mass, g/100 plantlings/+ % to control | | | |
|---|---|---|---|---|---|---|
| | | | wet | | dry | |
| | root | sprout | root | sprout | root | sprout |
| Mn-salt $1 \cdot 10^{-9}$% | 6.8 | 4.2 | 1.34 | 2.34 | 0.24 | 0.28 |
| | 42% | 35% | 37% | 55% | 14% | 12% |
| Cu-salt $1 \cdot 10^{-10}$% | 6.3 | 3.3 | 1.35 | 2.25 | 0.26 | 0.27 |
| | 31% | 27% | 38% | 49% | 24% | 8% |
| Zn-salt $1 \cdot 10^{-9}$% | 7.5 | 4.8 | 1.54 | 2.57 | 0.28 | 0.32 |
| | 56% | 48% | 57% | 70% | 33% | 28% |
| $HCP_{05}$ | 0.2 | 0.1 | 0.05 | 0.08 | 0.01 | 0.01 |

TABLE XXXIV

Effect of winter wheat treatment with manganese salt solutions of bis-(hydroxymethyl)-phosphinic acid on yield and quality of seeds

| Variants | Field germination, % | Viability, % | Yield, dt/ha | Number of grains in an ear | Grain mass from the main ear, g |
|---|---|---|---|---|---|
| Control | 67 | 41 | 21.7 | 29 | 0.8 |
| Seed treatment with Mg-salt $1 \cdot 10^{-7}$% | 70 | 55 | 29.2 | 31 | 1.1 |
| Seed treatment with Mg-salt $1 \cdot 10^{-7}$% + spraying plants with Mg-salt $1 \cdot 10^{-8}$% | 70 | 61 | 30.7 | 32 | 1.1 |
| Seed treatment with Melaphen $1 \cdot 10^{-7}$% | 71 | 74 | 28.0 | 27 | 1.0 |
| Seed treatment with Melaphen $1 \cdot 10^{-7}$% + spraying plants with Melaphen $1 \cdot 10^{-8}$% | 71 | 62 | 29.3 | 30 | 1.2 |

TABLE XXXV

Effect of winter wheat seed treatment with magnesium salt of bis-(hydroxymethyl)-phosphinic acid combined with spraying the plants with claimed bis-(hydroxymethyl)-phosphinic acid salts on yield and quality of seeds

| Variants | Field germination, % | Viability, % | Yield, dt/ha | Number of grains in an ear | Grain mass from the main ear, g |
|---|---|---|---|---|---|
| Control | 67 | 41 | 21.7 | 29 | 0.8 |
| Seed treatment with Mg-salt $1 \cdot 10^{-7}$% + spraying plants with Ca-salt $1 \cdot 10^{-8}$% | 69 | 46 | 31.8 | 32 | 1.2 |
| Seed treatment with Mg-salt $1 \cdot 10^{-7}$% + spraying plants with Co-salt $1 \cdot 10^{-8}$% | 70 | 60 | 29.3 | 32 | 1.2 |

The invention claimed is:

1. A method of regulating plant growth and development of winter wheat, spring wheat, corn, and rice, by treating seeds of winter wheat, spring wheat, corn, and rice, the method comprising the steps of:
   providing a plurality of seeds, the seeds chosen from the list consisting of winter wheat, spring wheat, corn, or rice;
   preparing a solution including Bis-(hydroxymethyl)-phosphinic acid having the general formula Me"+[OP(O)(CH$_2$OH)$_2$]$_n$;
   treating the seeds with the solution by soaking the seeds in the solution for a predetermined time period;
   germinating the seeds after soaking by sowing the seeds.
2. The method of claim 1, wherein n can be either 1 or 2.
3. The method of claim 1 wherein Me is a metal salt chosen from the list consisting of Hydrogen (H), Sodium (Na), Calcium (Ca), Magnesium (Mg), Cobalt (Co), Copper (Cu), Zinc (Zn), and Manganese (Mn).
4. The method of claim 1 wherein the seeds are soaked in the solution for one hour.

* * * * *